(12) United States Patent
Jahankhah et al.

(10) Patent No.: US 11,605,170 B2
(45) Date of Patent: Mar. 14, 2023

(54) ESTIMATING A DISPLACEMENT SEQUENCE OF AN OBJECT

(71) Applicants: Hossein Jahankhah, Tehran (IR); Mohammad Ali Goudarzi, Tehran (IR); Mohammad Mahdi Kabiri, Tehran (IR)

(72) Inventors: Hossein Jahankhah, Tehran (IR); Mohammad Ali Goudarzi, Tehran (IR); Mohammad Mahdi Kabiri, Tehran (IR)

(73) Assignee: INTERNATIONAL INSTITUTE OF EARTHQUAKE ENGINEERING AND SEISMOLOGYx, Tehran (IR)

( * ) Notice: Subject to any disclaimer, the term of this patent is extended or adjusted under 35 U.S.C. 154(b) by 176 days.

(21) Appl. No.: 17/062,996

(22) Filed: Oct. 5, 2020

(65) Prior Publication Data

US 2021/0019894 A1 Jan. 21, 2021

Related U.S. Application Data

(60) Provisional application No. 62/914,573, filed on Oct. 14, 2019.

(51) Int. Cl.
*G06T 7/246* (2017.01)
*G06T 7/73* (2017.01)

(52) U.S. Cl.
CPC ............ *G06T 7/248* (2017.01); *G06T 7/73* (2017.01); *G06T 2207/30204* (2013.01)

(58) Field of Classification Search
CPC .......... G06T 7/20; G06T 7/246; G06T 7/248; G06T 7/30; G06T 7/33; G06T 7/337; G06T 7/70; G06T 7/73; G06T 7/74; G06T 7/97; G06T 2207/30204; G06T 2207/30208
See application file for complete search history.

(56) References Cited

U.S. PATENT DOCUMENTS

| 2005/0105772 | A1* | 5/2005 | Voronka et al. | ....... G06V 40/20 382/103 |
| 2016/0148045 | A1* | 5/2016 | Bicer et al. | .......... G06V 40/107 348/370 |

\* cited by examiner

*Primary Examiner* — Andrew W Johns
(74) *Attorney, Agent, or Firm* — Bajwa IP Law Firm; Haris Zaheer Bajwa

(57) ABSTRACT

A method for estimating a displacement sequence of an object. The method includes mounting an optical marker on the object, exciting a plurality of optical sources of the optical marker, capturing a plurality of images, and extracting the displacement sequence from a first image of the plurality of images and a second image of the plurality of images. The plurality of optical sources are excited utilizing one or more processors. The plurality of optical sources are excited based on an excitation pattern. The plurality of images are captured utilizing an imaging device. The displacement sequence is extracted utilizing the one or more processors. The displacement sequence is associated with the excitation pattern.

17 Claims, 22 Drawing Sheets

100B

ESTIMATING A DISPLACEMENT SEQUENCE OF AN OBJECT

CROSS-REFERENCE TO RELATED APPLICATION

This application claims the benefit of priority from U.S. Provisional Patent Application Ser. No. 62/914,573, filed on Oct. 14, 2019, and entitled "HIGH FREQUENCY MOVEMENT RECORDING BASED ON MULTI-POSITIONING IN A SINGLE FRAME," which is incorporated herein by reference in its entirety.

TECHNICAL FIELD

The present disclosure generally relates to digital image processing, and particularly, to non-contact displacement measurement.

BACKGROUND

Estimating displacements of objects with high frequency motions has various applications in structural engineering and maintenance of mechanical-industrial equipment. One conventional method of displacement estimation is using measurement instruments with physical contact to objects of interest. When a movement range of an object is large, a measurement instrument with a physical contact may need to measure displacements in a wide range while keeping the physical contact. However, keeping a physical contact of a measurement instrument to a moving object in a wide range may be challenging. As a result, displacement estimation by measurement instruments with physical contact may be limited to moving objects with low range of movements. Moreover, since displacement estimation may be extracted from movements of measurement instruments, a physical contact may adversely affect a precision of displacement estimation. In addition, high precision measurement instruments with physical contact may be expensive. To avoid physical contact, image processing methods are used for displacement estimation. In this approach, an imaging device may capture some images from an object of interest and displacement information is extracted from images captured by image processing techniques. Due to phenomena such as motion blur and aliasing, displacement estimation of high frequency motions necessitates small exposure times of imaging devices, i.e., high sampling rate recordings. High-speed cameras may capture images in small exposure times, resulting in high sampling rate recordings. However, high-speed cameras may be expensive and may capture images with low resolution, resulting in a loss of accuracy. Moreover, high-speed cameras need a large amount of storage to store captured images. In addition, estimating displacements of an object utilizing a high-speed camera may require processing a large number of images, leading to a high computational complexity.

There is, therefore, a need for an image processing-based method for displacement estimation of an object with high frequency motions. There is also a need for a system for displacement estimation with simple imaging devices having conventional recording rates.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for estimating a displacement sequence of an object. An exemplary method may include mounting an optical marker on the object, exciting a plurality of optical sources of the optical marker, capturing a plurality of images of the optical marker, and extracting the displacement sequence from a first image of the plurality of images and a second image of the plurality of images. In an exemplary embodiment, the plurality of optical sources may be excited utilizing one or more processors. In an exemplary embodiment, the plurality of optical sources may be excited based on an excitation pattern. In an exemplary embodiment, the plurality of images may be captured utilizing an imaging device. In an exemplary embodiment, the plurality of images may be captured by capturing each image of the plurality of images in a respective time interval. In an exemplary embodiment, the displacement sequence may be extracted utilizing the one or more processors. In an exemplary embodiment, the displacement sequence may be associated with the excitation pattern. In an exemplary embodiment, the displacement sequence may be extracted from a first image of the plurality of images and a second image of the plurality of images.

In an exemplary embodiment, exciting the plurality of optical sources based on the excitation pattern may include exciting an $i^{th}$ optical source set of a plurality of optical source sets where $1 \leq i \leq N$, $N \leq M-1$, and $M>1$ is a number of the plurality of source sets. In an exemplary embodiment, the $i^{th}$ optical source set may be excited at a first $i^{th}$ moment $T_{1i}$ and a second $i^{th}$ moment $T_{2i}$ for $\Delta T$ seconds. In an exemplary embodiment, each of the plurality of optical source sets may include a respective subset of the plurality of optical sources. In an exemplary embodiment, an intersection of each two different optical source sets of the plurality of source sets may include a null set. An exemplary first $i^{th}$ moment $T_{1i}$ may be obtained according to a set of operations defined by $T_{1i}=(i-1)T/N$ where T is an exposure time of the imaging device. An exemplary second $i^{th}$ moment $T_{2i}$ may be obtained according to a set of operations defined by $T_{1i}=t_d+(i-1)T/N$ where $t_d \geq T$ is a time difference between capturing the first image and capturing the second image. An exemplary time duration $\Delta T$ may satisfy a condition according to $\Delta T \leq \delta/V_{max}$ where $\delta$ is a displacement error threshold and $V_{max}$ is an upper speed limit of the object.

In an exemplary embodiment, mounting the optical marker may include attaching a $(u,j)^{th}$ optical source to a $(u,j)^{th}$ point located on a surface of a plate, attaching a $(u+1,j)^{th}$ optical source of the plurality of optical sources to a $(u+1,j)^{th}$ point, attaching the plate to the object. In an exemplary embodiment, the $(u,j)^{th}$ optical source may be associated with the plurality of optical sources where $1 \leq u < M$ and $j \geq 1$. An exemplary $(u,j)^{th}$ point may be associated with a $(u,j)^{th}$ node of a $j^{th}$ plurality of nodes in a $j^{th}$ cycle graph. An exemplary $(u+1,j)^{th}$ point may be located on the surface of the plate. An exemplary $(u+1,j)^{th}$ point may be associated with a $(u+1,j)^{th}$ node of the $j^{th}$ plurality of nodes. An exemplary $(u+1,j)^{th}$ node may include an adjacent node of the $(u,j)^{th}$ node. In an exemplary embodiment, a distance $d_{ki}$ between an $(i,j)^{th}$ node of the $j^{th}$ plurality of nodes and a $(k,j)^{th}$ node of the $j^{th}$ plurality of nodes satisfies a condition according to $d_{ki} \geq V_{max}|k-i|\Delta T$ where $1 \leq k \leq N$, $V_{max}$ is an upper speed limit of the object. In an exemplary embodiment, a $(1,j)^{th}$ node of the $j^{th}$ plurality of nodes may include an adjacent node of an $(M,j)^{th}$ node of the $j^{th}$ plurality of nodes. In an exemplary embodiment, a distance $d_{N1}$ between the $(1,j)^{th}$ node and an $(N,j)^{th}$ node of the $j^{th}$ plurality of nodes satisfies a condition according to $d_{N1} > d_{sv}$. An exemplary distance $d_{sv}$ may include a distance between a $(s,j)^{th}$ node of the $j^{th}$ plurality of nodes and a $(v,j)^{th}$ node of the $j^{th}$ plurality of nodes. In an exemplary embodiment, the $(s,j)^{th}$ node may include an adjacent node of the $(v,j)^{th}$ node, where $1 \le s \le M$ and $1 \le v \le M$.

In an exemplary embodiment, exciting the plurality of optical sources may further include extracting a $j^{th}$ optical feature of the plurality of features. An exemplary $j^{th}$ optical feature may be extracted from the plurality of optical sources. An exemplary $j^{th}$ optical feature may be associated with the $j^{th}$ cycle graph. An exemplary $j^{th}$ optical feature may be different from an $r^{th}$ optical feature of the plurality of features where $r \ge 1$ and $r \ne j$.

In an exemplary embodiment, extracting the displacement sequence may include extracting a first $(i,j)^{th}$ optical mark from the first image. An exemplary first $(i,j)^{th}$ optical mark may be associated with the first $i^{th}$ moment $T_{1i}$ and the $j^{th}$ optical feature. An exemplary first $(i,j)^{th}$ optical mark may include a first $(i,j)^{th}$ horizontal position of a plurality of horizontal positions and a first $(i,j)^{th}$ vertical position of a plurality of vertical positions. In an exemplary embodiment, extracting the first $(i,j)^{th}$ optical mark may include extracting a first plurality of optical marks from the first image, obtaining a first $j^{th}$ optical mark set, obtaining a first $j^{th}$ plurality of distances, extracting a first $(1,j)^{th}$ optical mark from the first $j^{th}$ optical mark set, obtaining a first $(n-1)^{th}$ distance set, and extracting a first $(n,j)^{th}$ optical mark from the first $j^{th}$ optical mark set. In an exemplary embodiment, each optical mark of the first plurality of optical marks may be associated with a respective optical source of the plurality of optical sources. In an exemplary embodiment, the first $j^{th}$ optical mark set may include the first $(i,j)^{th}$ optical mark. An exemplary first $j^{th}$ optical mark set may be obtained by selecting a subset of the first plurality of optical marks that are associated with the $j^{th}$ optical feature. In an exemplary embodiment, each distance of the first $j^{th}$ plurality of distances may be associated with a respective pair of optical marks in the first $j^{th}$ optical mark set. An exemplary first $(1,j)^{th}$ optical mark may be extracted based on a $j^{th}$ direction. In an exemplary embodiment, the $j^{th}$ direction may be associated with the $j^{th}$ cycle graph. An exemplary first $(1,j)^{th}$ optical mark may be associated with a largest of the first $j^{th}$ plurality of distances. In an exemplary embodiment, each distance in the first $(n-1)^{th}$ distance set may be associated with a first $(n-1,j)^{th}$ optical mark in the first $j^{th}$ optical mark set where $2 \le n \le N$. An exemplary first $(n,j)^{th}$ optical mark may be associated with a smallest distance in the first $(n-1)^{th}$ distance set.

In an exemplary embodiment, exciting the plurality of optical sources may further include exciting an $(M,j)^{th}$ optical source of the plurality of optical sources at a moment $t_d - T/N$. In an exemplary embodiment, capturing the plurality of images may include capturing the first image in a time interval $(0, T)$, capturing the second image in a time interval $(t_d, t_d + T)$, and capturing a third image of the plurality of images in a time interval $(t_d - T, t_d)$.

In an exemplary embodiment, extracting the displacement sequence may further include extracting a second $(i,j)^{th}$ optical mark. An exemplary second $(i,j)^{th}$ optical mark may be extracted from the second image. An exemplary second $(i,j)^{th}$ optical mark may be associated with the second $i^{th}$ moment $T_{2i}$ and the $j^{th}$ optical feature. In an exemplary embodiment, the second $(i,j)^{th}$ optical mark may include a second $(i,j)^{th}$ horizontal position of the plurality of horizontal positions and a second $(i,j)^{th}$ vertical position of the plurality of vertical positions. In an exemplary embodiment, extracting the second $(i,j)^{th}$ optical mark may include extracting a second plurality of optical marks from the second image, obtaining a second $j^{th}$ optical mark set, extracting a third $j^{th}$ optical mark from the third image, obtaining a second $j^{th}$ plurality of distances, extracting a second $(1,j)^{th}$ optical mark from the second $j^{th}$ optical mark set, obtaining a second $(n-1)^{th}$ distance set based on the second $j^{th}$ plurality of distances and extracting a second $(n,j)^{th}$ optical mark from the second $j^{th}$ optical mark set. In an exemplary embodiment, each optical mark of the second plurality of optical marks may be associated with a respective optical source of the plurality of optical sources. An exemplary second $j^{th}$ optical mark set may include the second $(i,j)^{th}$ optical mark. An exemplary second $j^{th}$ optical mark set may be obtained by selecting a subset of the second plurality of optical marks that is associated with the $j^{th}$ optical feature. In an exemplary embodiment, the third $j^{th}$ optical mark may be associated with the $(M,j)^{th}$ optical source. In an exemplary embodiment, each distance of the second $j^{th}$ plurality of distances may include a distance between a respective optical mark in the second $j^{th}$ optical mark set and the third $j^{th}$ optical mark. An exemplary second $(1,j)^{th}$ optical mark may be extracted based on the $j^{th}$ direction. An exemplary second $(1,j)^{th}$ optical mark may be associated with a smallest distance of the second $j^{th}$ plurality of distances. An exemplary second $(n,j)^{th}$ optical mark may be associated with a smallest distance in a second $(n-1)^{th}$ distance set. In an exemplary embodiment, each distance in the second $(n-1)^{th}$ distance set may be associated with a second $(n-1,j)^{th}$ optical mark in the second $j^{th}$ optical mark set.

An exemplary method may further include obtaining a center point of the optical marker. In an exemplary embodiment, obtaining the center point may include calculating an average horizontal position of the center point and calculating an average vertical position of the center point. An exemplary average horizontal position may be calculated by averaging the plurality of horizontal positions of the optical marker. An exemplary average vertical position may be calculated by averaging the plurality of vertical positions of the optical marker.

In an exemplary embodiment, extracting the displacement sequence may further include obtaining an $i^{th}$ displacement set of the displacement sequence. In an exemplary embodiment, obtaining the $i^{th}$ displacement set may include calculating a first $i^{th}$ horizontal center $x_{ci}$ and a first $i^{th}$ vertical center $y_{ci}$, calculating a second $i^{th}$ horizontal center $x'_{ci}$ and a second $i^{th}$ vertical center $y'_{ci}$, calculating an $i^{th}$ rotation $\Delta\theta_i$ of the $i^{th}$ displacement set, calculating an $i^{th}$ horizontal difference $\Delta x_{ci}$ and an $i^{th}$ vertical difference $\Delta y_{ci}$, calculating an $i^{th}$ horizontal displacement $\Delta x_i$ of the $i^{th}$ displacement set, and calculating an $i^{th}$ vertical displacement $\Delta y_i$ of the $i^{th}$ displacement set. An exemplary first $i^{th}$ horizontal center $x_{ci}$ may be calculated based on a first $(i,1)^{th}$ horizontal position of the plurality of horizontal positions and a first $(i,2)^{th}$ horizontal position of the plurality of horizontal positions. An exemplary first $i^{th}$ vertical center $x_{ci}$ may be calculated based on a first $(i,1)^{th}$ vertical position of the plurality of vertical positions and a first $(i,2)^{th}$ vertical position of the plurality of vertical positions. An exemplary second $i^{th}$ horizontal center $x_{ci}$ may be calculated based on a second $(i,1)^{th}$ horizontal position of the plurality of horizontal positions and a second $(i,2)^{th}$ horizontal position of the plurality of horizontal positions. An exemplary second $i^{th}$ vertical center $x_{ci}$ may be calculated based on a second $(i,1)^{th}$ vertical position of the plurality of vertical positions and a second $(i,2)^{th}$ vertical position of the plurality of vertical positions. An exemplary $i^{th}$ rotation $\Delta\theta_i$ may be calculated based on the first $(i,1)^{th}$ horizontal position, the first $(i,2)^{th}$ horizontal position, the first $(i,1)^{th}$ vertical position, the first $(i,2)^{th}$ vertical position, second $(i,2)^{th}$ horizontal position, the second $(i,2)^{th}$ horizontal position, the second $(i,1)^{th}$ vertical position, and the second $(i,2)^{th}$ vertical position. An exemplary horizontal difference $\Delta x_{ci}$ may be calculated based on first $i^{th}$ horizontal center $x_{ci}$ and a horizontal center of the optical marker. An exemplary vertical difference $\Delta y_{ci}$ may be calculated based on first $i^{th}$ vertical center $y_{ci}$ and a vertical center of the optical marker. An exemplary $i^{th}$ horizontal displacement $\Delta x_i$ may be calculated based on the second $i^{th}$ horizontal center $x'_{ci}$, the horizontal center of the optical marker, the $i^{th}$ horizontal difference $\Delta x_{ci}$, the $i^{th}$ vertical difference $\Delta y_{ci}$, and the $i^{th}$ rotation $\Delta\theta_i$. An exemplary $i^{th}$ vertical displacement $\Delta y_i$ may be calculated based on the second $i^{th}$ vertical center $y'_{ci}$, the vertical center of the optical marker, the $i^{th}$ horizontal difference $\Delta x_{ci}$, the $i^{th}$ vertical difference $\Delta y_{ci}$, and the $i^{th}$ rotation $\Delta\theta_i$. In an exemplary embodiment, capturing the first image may include capturing the first image in a time interval $(0,T)$. In an exemplary embodiment, capturing the second image may include capturing the second image in a time interval $(t_d, t_d+T)$.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method for an image processing-based method for displacement estimation of an object with high frequency motions, that is, high-speed vibrations of an object caused by a vibration source, for example, an earthquake, a vehicle, and a shaking table. An exemplary method may utilize an optical marker and an imaging device. To estimate a displacement of an exemplary object, a number of optical sources in the optical marker may be excited with a predefined pattern during an exposure time of the imaging device. An exemplary exposure time of the imaging device may refer to an amount of time that a shutter of the imaging device is open for capturing an image. As a result, each captured image may include a number of optical marks generated by optical sources that are excited in the exposure time. An exemplary excitation order of optical sources may be then inferred according to the predefined pattern. An exemplary excited optical source may generate a respective optical mark in each captured image. Comparing positions of optical marks generated by an optical source in two successive images may provide a displacement of the object between two excitation moments of the optical source. Therefore, a displacement sequence of the object may be obtained by cascading displacements obtained by each optical source. A number of displacements in the displacement sequence may be equal to a number of excited optical sources in each of two successive images. As a result, displacement estimations may be done in a smaller amount of time than the exposure time of the imaging device.

Figure 1A:
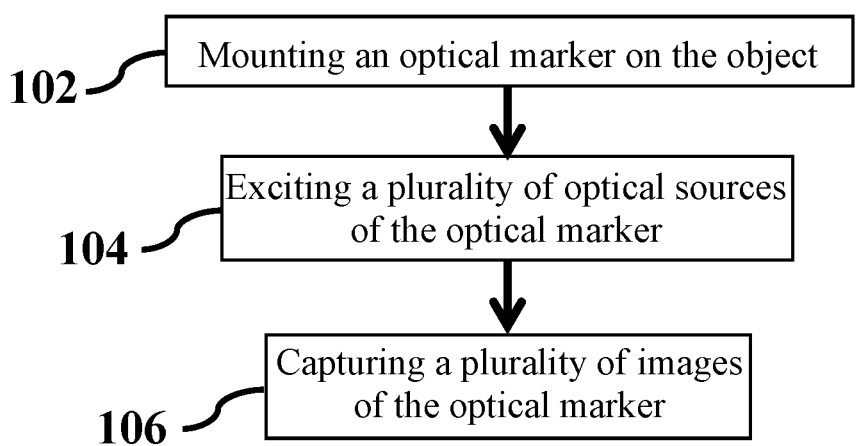
FIG. 1A shows a flowchart of a method for estimating a displacement sequence of an object, consistent with one or more exemplary embodiments of the present disclosure.

FIG. 1A shows a flowchart of a method for estimating a displacement sequence of an object, consistent with one or more exemplary embodiments of the present disclosure. An exemplary method 100A may include mounting an optical marker on an object (step 102), exciting a plurality of optical sources of the optical marker (step 104), capturing a plurality of images of the optical marker (step 106). In an exemplary embodiment, method 100A may be utilized to obtain a displacement sequence of the object in a time interval between capturing a first image of the plurality of images and capturing a second image of the plurality of images.

Figure 2A:
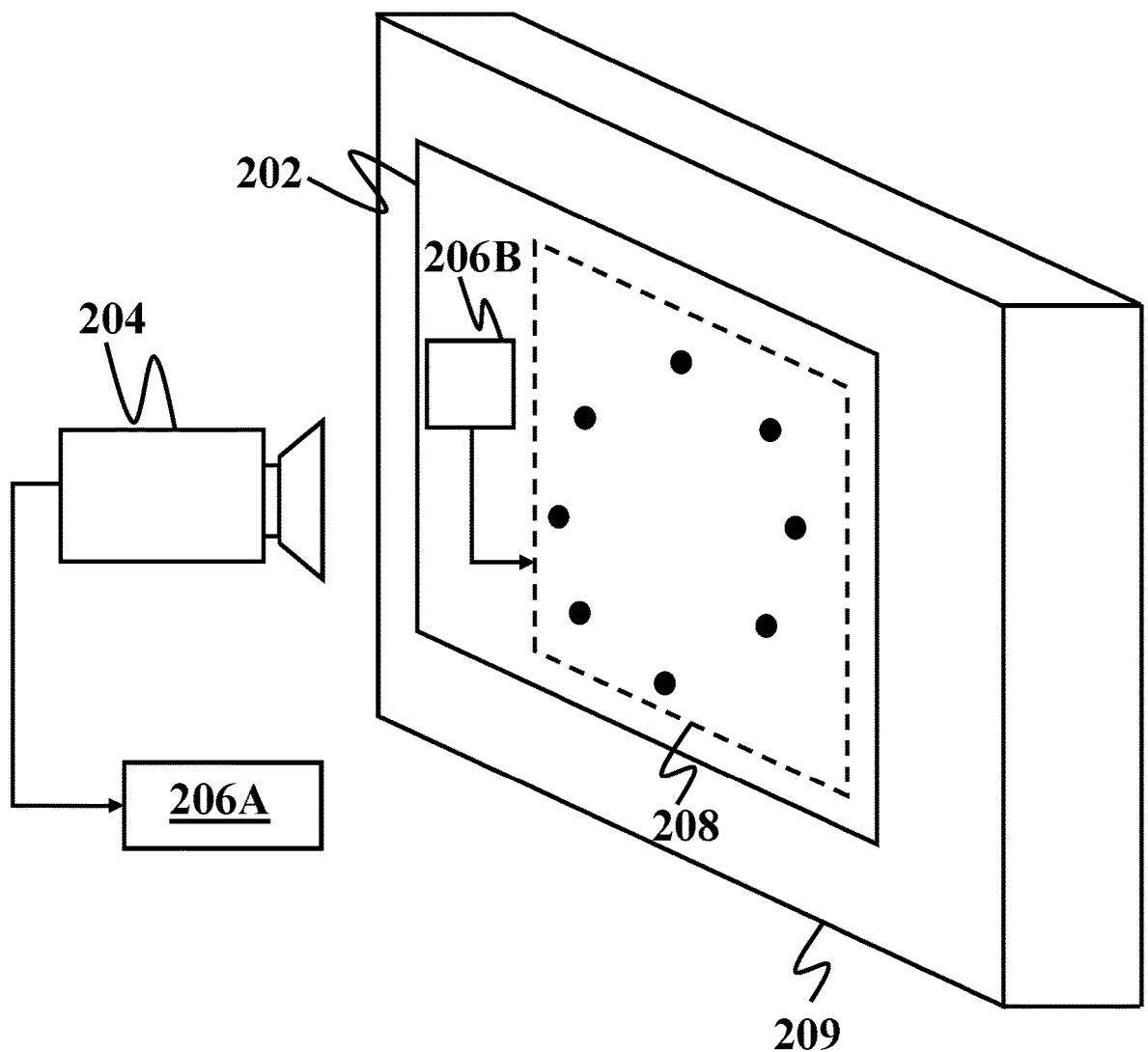
FIG. 2A shows a schematic of a system for estimating a displacement sequence of an object, consistent with one or more exemplary embodiments of the present disclosure.

FIG. 2A shows a schematic of a system for estimating a displacement sequence of an object, consistent with one or more exemplary embodiments of the present disclosure. In an exemplary embodiment, different steps of method 100A may be implemented utilizing a system 200. In an exemplary embodiment, system 200 may include an optical marker 202, an imaging device 204, and a first processor 206A. In an exemplary embodiment, optical marker 202 may include a plurality of optical sources 208 and a second processor 206B. In an exemplary embodiment, optical marker 202 may be mounted on an object 209. In an exemplary embodiment, object 209 may refer to a civil structure, a vehicle, or an industrial equipment. In an exemplary embodiment, plurality of optical sources 208 may include a plurality of light sources configured to be intermittently turned on and turned off. In an exemplary embodiment, plurality of optical sources 208 may be implemented utilizing a plurality of light-emitting diodes (LEDs). In an exemplary embodiment, imaging device 202 may refer to an electronic optical device capable of recording visual images. In an exemplary embodiment, imaging device 202 may include a camera with a low frame rate, for example, 30 frames per second or 60 frames per second.

Figure 1B:
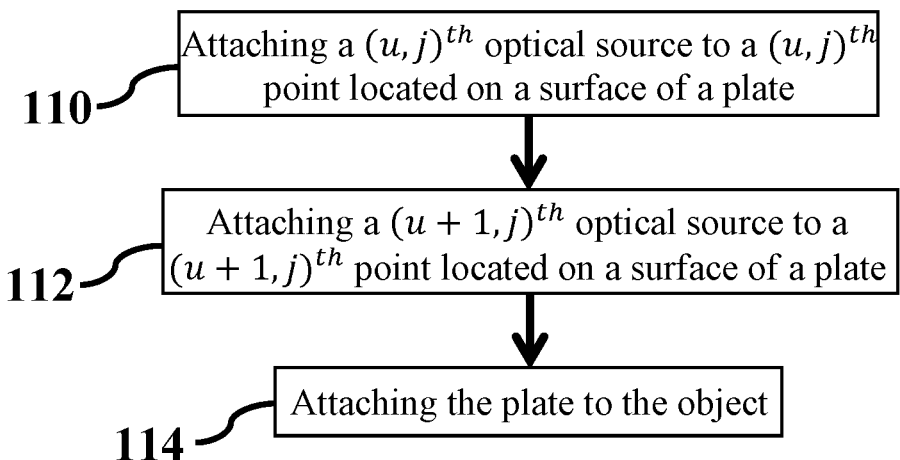
FIG. 1B shows a flowchart of a method for mounting an optical marker, consistent with one or more exemplary embodiments of the present disclosure.

For further detail with respect to step 102, FIG. 1B shows a flowchart of a method for mounting an optical marker, consistent with one or more exemplary embodiments of the present disclosure. In an exemplary embodiment, mounting optical marker 202 may include attaching a $(u,j)^{th}$ optical source of plurality of optical sources 208 to a $(u,j)^{th}$ point located on a surface of a plate (step 110), attaching a $(u+1,j)^{th}$ optical source of plurality of optical sources 208 to a $(u+1,j)^{th}$ point (step 112), attaching the plate to object 209 (step 114). In an exemplary embodiment, step 102 may determine a respective location of each of plurality of optical sources 208 on the surface of the plate.

Figure 2B:
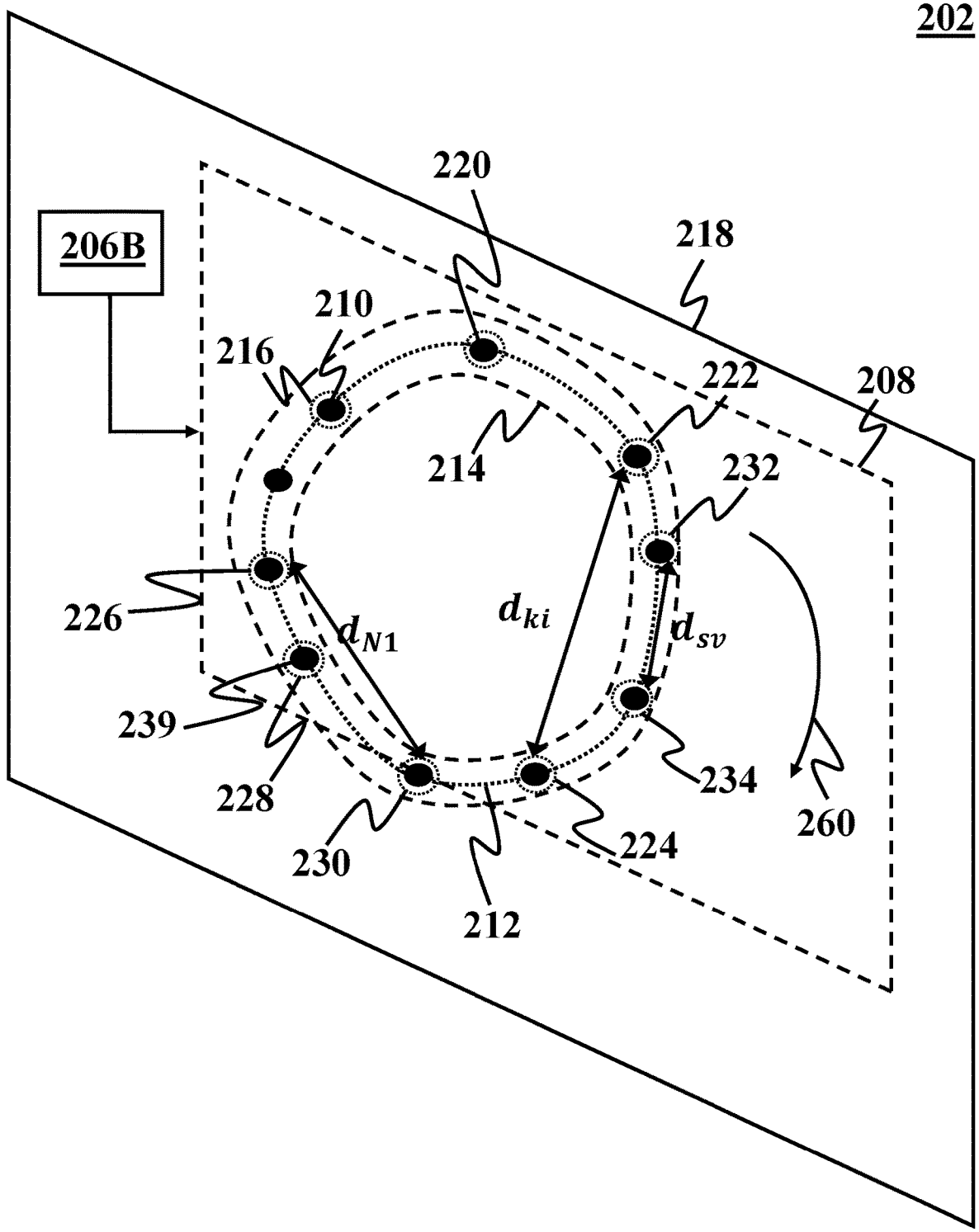
FIG. 2B shows a schematic of an optical marker, consistent with one or more exemplary embodiments of the present disclosure.

FIG. 2B shows a schematic of an optical marker, consistent with one or more exemplary embodiments of the present disclosure. In an exemplary embodiment, plurality of optical sources 208 may include a $(u,j)^{th}$ optical source 210. In an exemplary embodiment, optical marker may include a $j^{th}$ cycle graph 212 and. In an exemplary embodiment, $j^{th}$ cycle graph 212 may include a $j^{th}$ plurality of nodes 214. In an exemplary embodiment, $j^{th}$ plurality of nodes 214 may include a $(u,j)^{th}$ node 216. In an exemplary embodiment, optical marker may further include a plate 218. In an exemplary embodiment, plate 218 may refer to a solid surface such as a metal sheet and a plastic sheet. In an exemplary embodiment, plurality of optical sources 208 may be placed on plate 218.

In further detail regarding step 110, an exemplary $(u,j)^{th}$ point may be located at a position of $(u,j)^{th}$ node 216 of $j^{th}$ plurality of nodes 214 in $j^{th}$ cycle graph 212 where $1 \leq u < M$, $j \geq 1$, and M is a number of $j^{th}$ plurality of nodes 214. In an exemplary embodiment, $(u,j)^{th}$ point may include a $(u,j)^{th}$ horizontal position and a $(u,j)^{th}$ vertical position on plate 218. In an exemplary embodiment, $(u,j)^{th}$ node 216 may be represented on the $(u,j)^{th}$ horizontal position and the $(u,j)^{th}$ vertical position. An exemplary $(u,j)^{th}$ optical source 210 may be located on the $(u,j)^{th}$ horizontal position and the $(u,j)^{th}$ vertical position.

For further detail regarding step 112, an exemplary $(u+1, j)^{th}$ point may be located on a surface of plate 218. An exemplary $(u+1,j)^{th}$ point may be located at a position of a $(u+1,j)^{th}$ node 220 of $j^{th}$ plurality of nodes 214. An exemplary $(u+1,j)^{th}$ node 220 may include an adjacent node of $(u,j)^{th}$ node 216. In an exemplary embodiment, a distance $d_{ki}$ between an $(i,j)^{th}$ node 222 of $j^{th}$ plurality of nodes 214 and a $(k,j)^{th}$ node 224 of $j^{th}$ plurality of nodes 214 satisfies a condition according to $d_{ki} \geq V_{max}|k-i|\Delta T$ where $1 \leq k \leq N$, $1 \leq i \leq N$, $N \leq M-1$, and $V_{max}$ is an upper speed limit of object 209. In an exemplary embodiment, each of plurality of optical sources 208 may be excited for a time duration of $\Delta T$ seconds. In an exemplary embodiment, when distance $d_{ki}$ is smaller than $V_{max}|k-i|\Delta T$, a captured light emitted from a pair of optical sources located on $(i,j)^{th}$ node 222 and $(k,j)^{th}$ node 224 may be indistinguishable due to a motion of object 209. Consequently, a respective displacement of object 209 may not be extracted from the pair of optical sources. In an exemplary embodiment, when distance $d_{ki}$ satisfies $d_{ki} \geq V_{max}|k-i|\Delta T$, captured lights emitted from plurality of optical sources 208, may be distinguished from each other as long as a speed of object 209 is smaller than $V_{max}$.

In an exemplary embodiment, a $(1,j)^{th}$ node 226 of $j^{th}$ plurality of nodes 214 may include an adjacent node of an $(M,j)^{th}$ node 228 of $j^{th}$ plurality of nodes 214. In an exemplary embodiment, a distance $d_{N1}$ between $(1,j)^{th}$ node 226 and an $(N,j)^{th}$ node 230 of $j^{th}$ plurality of nodes 214 satisfies a condition according to $d_{N1} > d_{sv}$. An exemplary distance $d_{sv}$ may include a distance between a $(s,j)^{th}$ node 232 of $j^{th}$ plurality of nodes 214 and a $(v,j)^{th}$ node 234 of $j^{th}$ plurality of nodes 214. In an exemplary embodiment, $(s,j)^{th}$ node 232 may include an adjacent node of $(v,j)^{th}$ node 234, where $1 \le s \le M$ and $1 \le v \le M$.

In an exemplary embodiment, step 114 may include attaching plate 218 to object 209. In an exemplary embodiment, when a respective distance of each optical source pair of plurality of optical sources 208 is changing, estimation of the displacement sequence may be subjected to error. As a result, in an exemplary embodiment, a position of each of plurality of optical sources 208 with respect to other optical sources of plurality of optical sources 208 may be fixed when imaging device 204 captures the first image and the second image of optical marker 202. In doing so, each of plurality of optical sources 208 may be attached to a respective point on plate 218. As a result, a respective distance between two optical sources in each optical source pair of plurality of optical sources 208 may be fixed when imaging device 204 captures the first image and the second image.

Figure 1C:
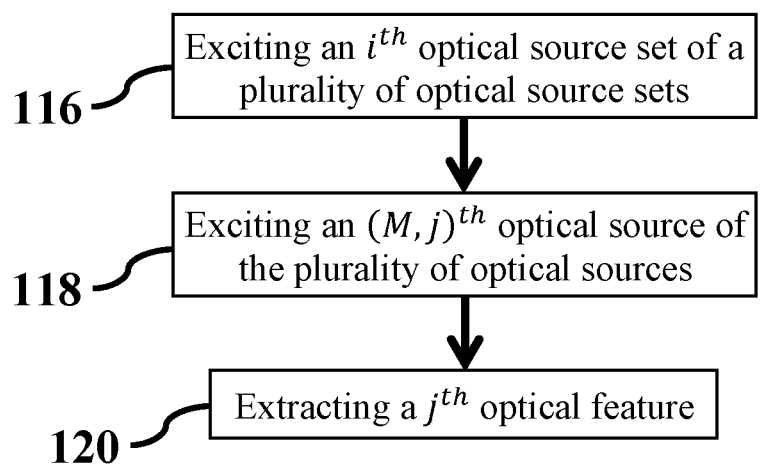
FIG. 1C shows a flowchart of a method for exciting a plurality of optical sources, consistent with one or more exemplary embodiments of the present disclosure.

In further detail with respect to step 104, FIG. 1C shows a flowchart of a method for exciting a plurality of optical sources, consistent with one or more exemplary embodiments of the present disclosure. In an exemplary embodiment, step 104 may include exciting plurality of optical sources 208. In an exemplary embodiment, exciting plurality of optical sources 208 may include exciting an $i^{th}$ optical source set of a plurality of optical source sets (step 116), exciting an $(M,j)^{th}$ optical source of the plurality of optical sources (step 118), and extracting a $j^{th}$ optical feature from the plurality of optical sources (step 120). In an exemplary embodiment, plurality of optical sources 208 may be excited utilizing second processor 206B.

Figure 3:
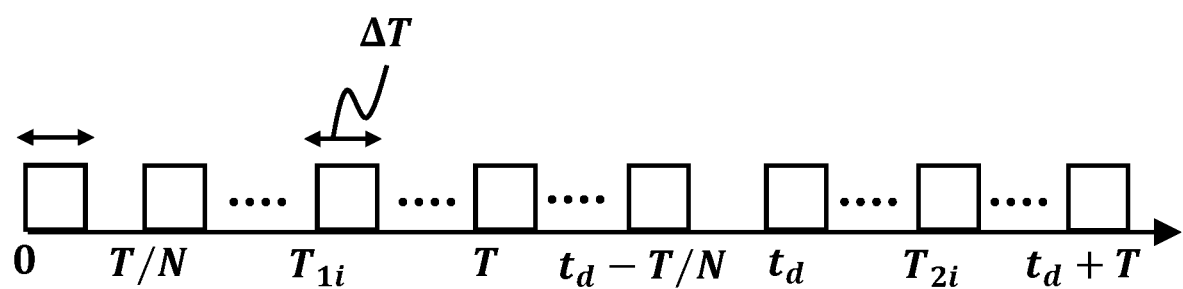
FIG. 3 shows an excitation pattern, consistent with one or more exemplary embodiments of the present disclosure.

FIG. 3 shows an excitation pattern, consistent with one or more exemplary embodiments of the present disclosure. As shown in FIG. 3, a timeline of an excitation pattern 300 may include a plurality of excitation pulses. In an exemplary embodiment, each of the plurality of excitation pulses may excite a respective optical source of plurality of optical sources 208. In an exemplary embodiment, plurality of optical sources 208 may be excited by applying a respective excitation pulse to each of plurality of optical sources 208. In an exemplary embodiment, an excitation pulse may be applied by applying a respective electric signal to each of plurality of optical sources 208. In an exemplary embodiment, an electric signal may be applied when second processor 206B generates a respective excitation pulse.

Figure 2C:
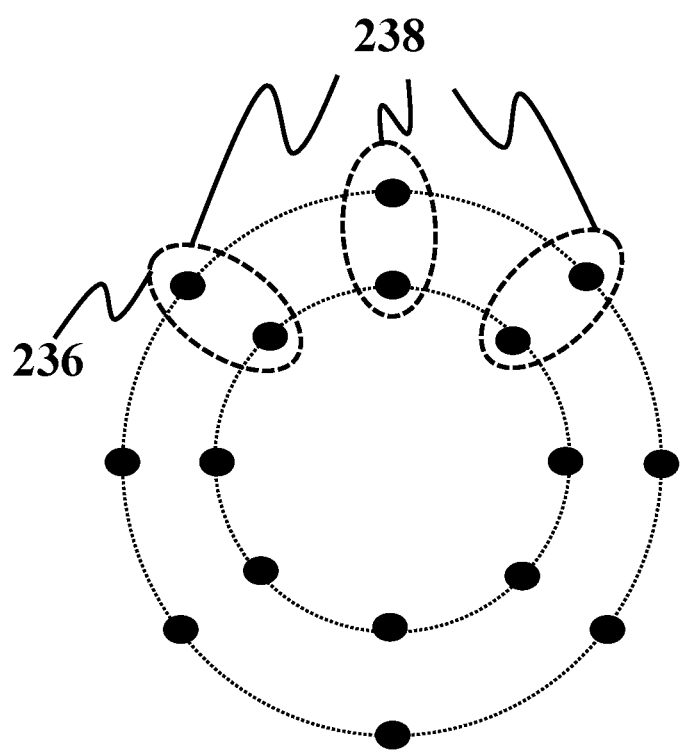
FIG. 2C shows a plurality of optical sources, consistent with one or more exemplary embodiments of the present disclosure.

FIG. 2C shows a plurality of optical sources, consistent with one or more exemplary embodiments of the present disclosure. In an exemplary embodiment, plurality of optical sources 208 may include a plurality of optical source sets 238. In an exemplary embodiment, plurality of optical source sets 238 may include an $i^{th}$ optical source set 236.

In an exemplary embodiment, step 116 may include exciting $i^{th}$ optical source set 236. Referring to FIGS. 2C and 3, in an exemplary embodiment, exciting plurality of optical sources 208 based on excitation pattern 300 may include exciting $i^{th}$ optical source set 236. In an exemplary embodiment, $i^{th}$ optical source set 236 may be excited at a first $i^{th}$ moment $T_{1i}$ and a second $i^{th}$ moment $T_{2i}$ for $\Delta T$ seconds. In an exemplary embodiment, each of plurality of optical source sets 238 may include a respective subset of plurality of optical sources 208. In an exemplary embodiment, an intersection of each two different optical source sets of plurality of source sets 238 may include a null set. An exemplary first $i^{th}$ moment $T_{1i}$ may be obtained according to an operation defined by $T_{1i}=(i-1)T/N$ where T is an exposure time of imaging device 204. An exemplary second $i^{th}$ moment $T_{2i}$ may be obtained according to an operation defined by $T_{2i}=t_d(i-1)T/N$ where $t_d \ge T$. In an exemplary embodiment, a frame rate of imaging device may include 1/T frames per second. In an exemplary embodiment, plurality of optical source sets 238 may be excited during a single exposure timeT. Since, a number of plurality of optical source sets 238 may include N, an excitation frequency of excitation pattern 300 may include N/T. As a result, the displacement sequence of object 209 may be estimated in each T/N seconds, that is N times larger than the frame rate of imaging device 204. Therefore, for estimating the displacement sequence, imaging device 204 may capture images with a smaller frame rate than excitation frequency. On the other hand, for lower time resolution of estimating the displacement sequence, a larger number of plurality of optical source sets 238, that is a larger N, may be embedded in optical marker 202.

An exemplary time duration $\Delta T$ may satisfy a condition according to $\Delta T \le \delta / V_{max}$ where $\delta$ is a displacement error threshold and $V_{max}$ is an upper speed limit of object 209. In an exemplary embodiment, object 209 may move during excitation of $i^{th}$ optical source set 236. Consequently, a motion blur phenomenon may occur in capturing the first image and capturing the second image. As a result, time duration $\Delta T$ may be chosen small enough to avoid the motion blur.

Referring again to FIGS. 2B and 3, in an exemplary embodiment, step 118 may include exciting an $(M,j)^{th}$ optical source 239 of plurality of optical sources 208. In an exemplary embodiment, $(M,j)^{th}$ optical source 239 may be located on $(M,j)^{th}$ node 228. In an exemplary embodiment, $(M,j)^{th}$ optical source 239 may be excited at a moment $t_d$-T/N.

For further detail with regards to step 120, in an exemplary embodiment, exciting plurality of optical sources 208 may further include extracting a $j^{th}$ optical feature of a plurality of optical features. An exemplary $j^{th}$ optical feature may be extracted from plurality of optical sources 208. An exemplary $j^{th}$ optical feature may be associated with $j^{th}$ cycle graph 212. An exemplary $j^{th}$ optical feature may be different from an $r^{th}$ optical feature of the plurality of optical features where $r \ge 1$ and $r \ne j$. In an exemplary embodiment, each optical source located on a respective node in $j^{th}$ cycle graph 212 may include the $j^{th}$ optical feature. An exemplary $j^{th}$ optical feature may be recognized from a light emitted from each optical source located on a respective node in $j^{th}$ cycle graph 212. In an exemplary embodiment, a light emitted from each optical source located on $j^{th}$ cycle graph 212 may generate a respective optical mark in each image of the plurality of images. In an exemplary embodiment, optical marks generated by optical sources located on $j^{th}$ cycle graph 212 may include the $j^{th}$ optical feature. As a result, the $j^{th}$ optical feature may be extracted by extracting the $j^{th}$ optical feature from optical marks of each image of the plurality of images. An exemplary $j^{th}$ optical feature may include a color of an emitted light, a brightness, a shape, and a size of each optical source located on a respective node of $j^{th}$ cycle graph 212.

Figure 2D:
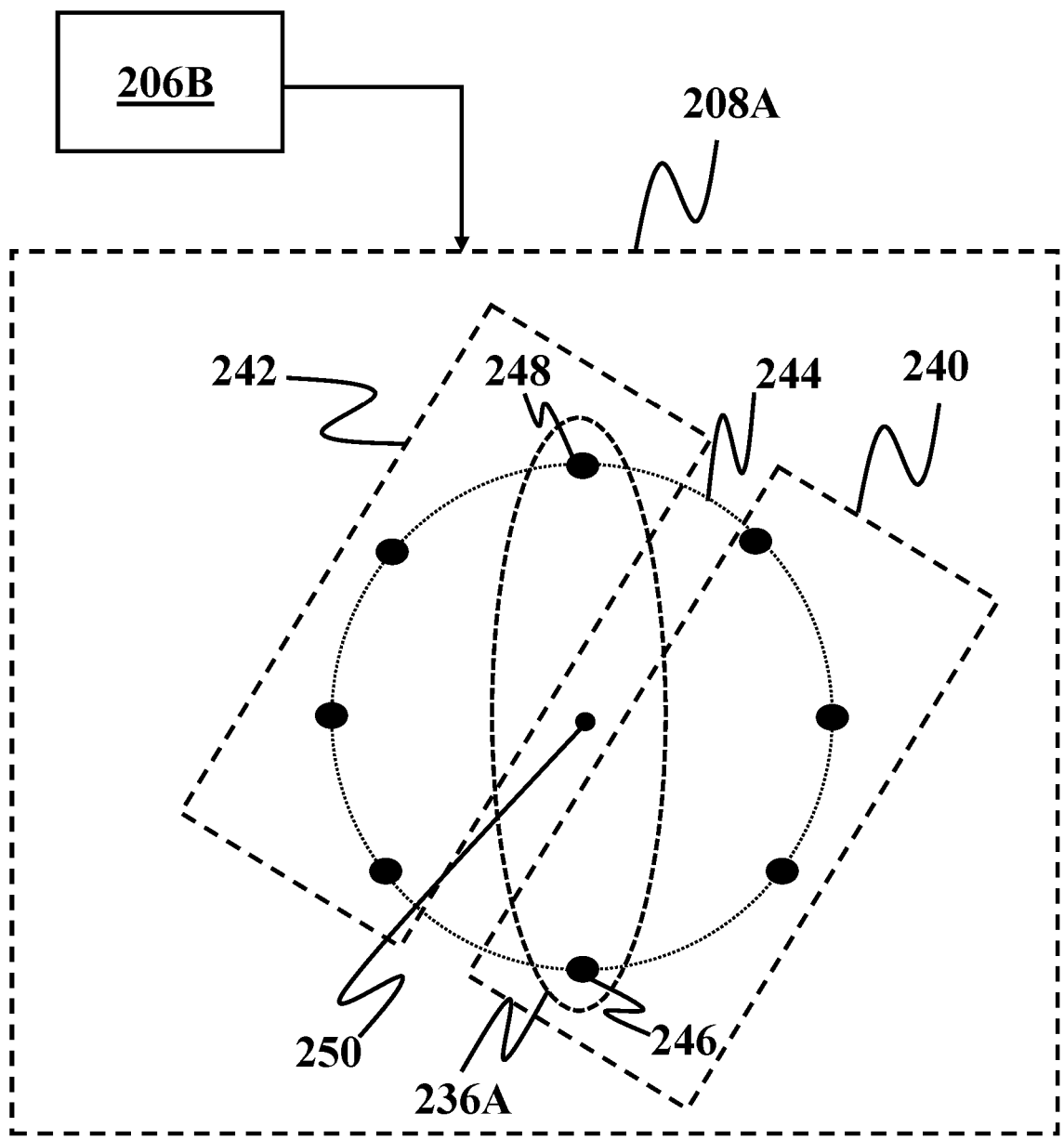
FIG. 2D shows a schematic of a single ring optical marker, consistent with one or more exemplary embodiments of the present disclosure.

FIG. 2D shows a schematic of a single ring optical marker, consistent with one or more exemplary embodiments of the present disclosure. In an exemplary embodiment, a single ring optical marker 202A may include a first implementation of optical marker 202. In an exemplary embodiment, single ring optical marker 202A may include a first cycle graph 240 and a second cycle graph 242. In an exemplary embodiment, each of first cycle graph 240 and second cycle graph 242 may include a half circle graph. In an exemplary embodiment, a combination of first cycle graph 240 and second cycle graph 242 may include a third cycle graph 244. In an exemplary embodiment, single ring optical marker 202A may include a first plurality of optical sources 208A. In an exemplary embodiment, first plurality of optical sources 208A may include a first implementation of plurality of optical sources 208. In an exemplary embodiment, first plurality of optical sources 208A may include a first $i^{th}$ optical source set 236A. In an exemplary embodiment, first $i^{th}$ optical source set 236A may include a first implementation of $i^{th}$ optical source set 236.

In an exemplary embodiment, first $i^{th}$ optical source set 236A may include two optical sources of first plurality of optical sources 208A. In an exemplary embodiment, a first optical source 246 in first $i^{th}$ optical source set 236A may be located on a respective node in first cycle graph 240. In an exemplary embodiment, a second optical source 248 in first $i^{th}$ optical source set 236A may be located on a respective node in second cycle graph 242. In an exemplary embodiment, first optical source 246 and second optical source 248 may be located on two symmetric nodes of third cycle graph 244 with respect to a first center point 250 of third cycle graph 244.

Figure 2E:
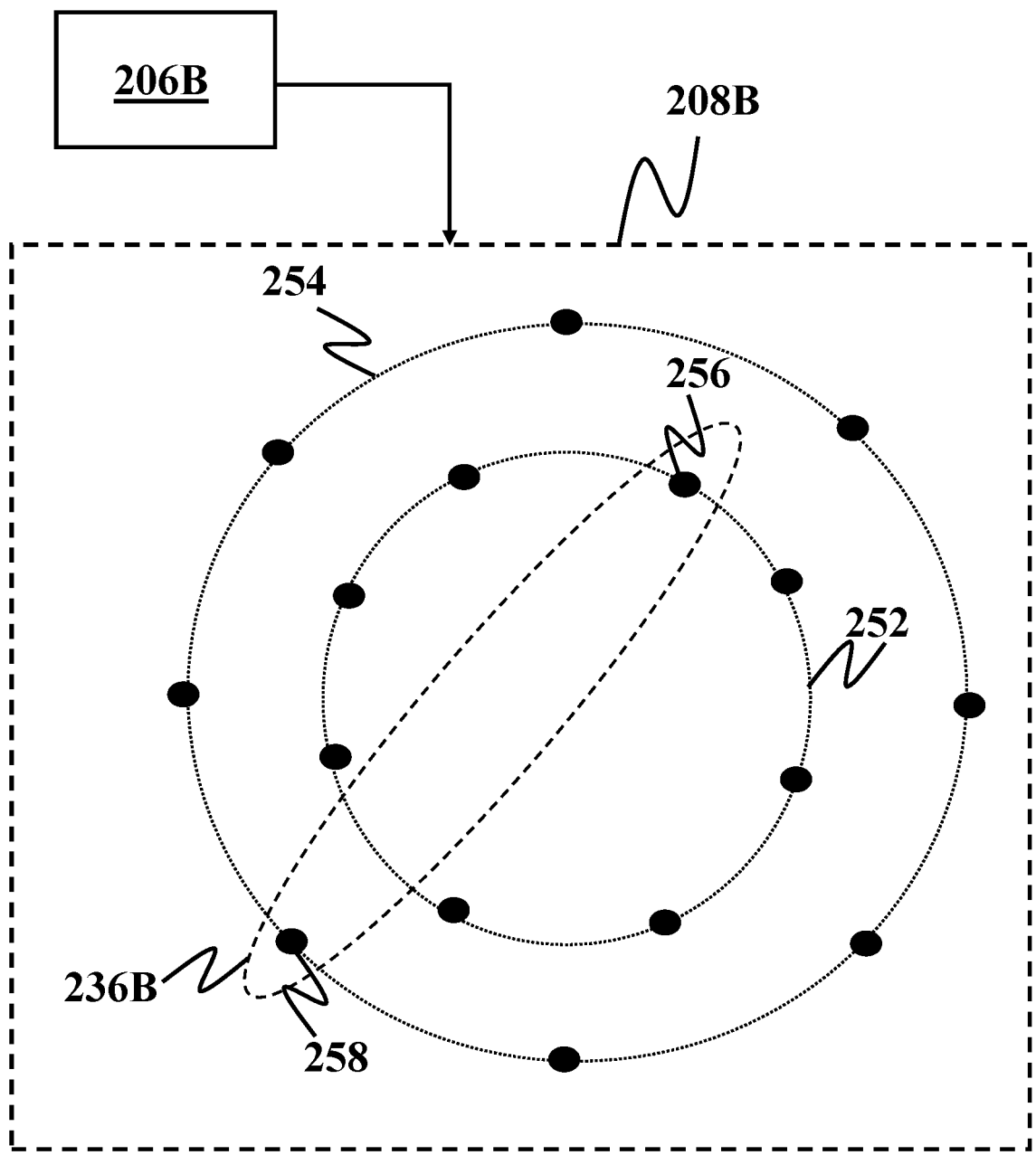
FIG. 2E shows a schematic of a double ring optical marker, consistent with one or more exemplary embodiments of the present disclosure.

FIG. 2E shows a schematic of a double ring optical marker, consistent with one or more exemplary embodiments of the present disclosure. In an exemplary embodiment, a double ring optical marker 202B may include a second implementation of optical marker 202. In an exemplary embodiment, a double ring optical marker 202B may include a fourth cycle graph 252 and a fifth cycle graph 254. In an exemplary embodiment, double ring optical marker 202B may include a second plurality of optical sources 208B. In an exemplary embodiment, second plurality of optical sources 208B may include a second implementation of plurality of optical sources 208. In an exemplary embodiment, second plurality of optical sources 208B may include a second $i^{th}$ optical source set 236B. In an exemplary embodiment, second $i^{th}$ optical source set 236B may include a second implementation of $i^{th}$ optical source set 236.

In an exemplary embodiment, second $i^{th}$ optical source set 236B may include a third optical source 256 and a fourth optical source 258. In an exemplary embodiment, third optical source 256 may be located on a respective node in fourth cycle graph 252. In an exemplary embodiment, fourth optical source 258 may be located on a respective node in fifth cycle graph 254.

Figure 4A:
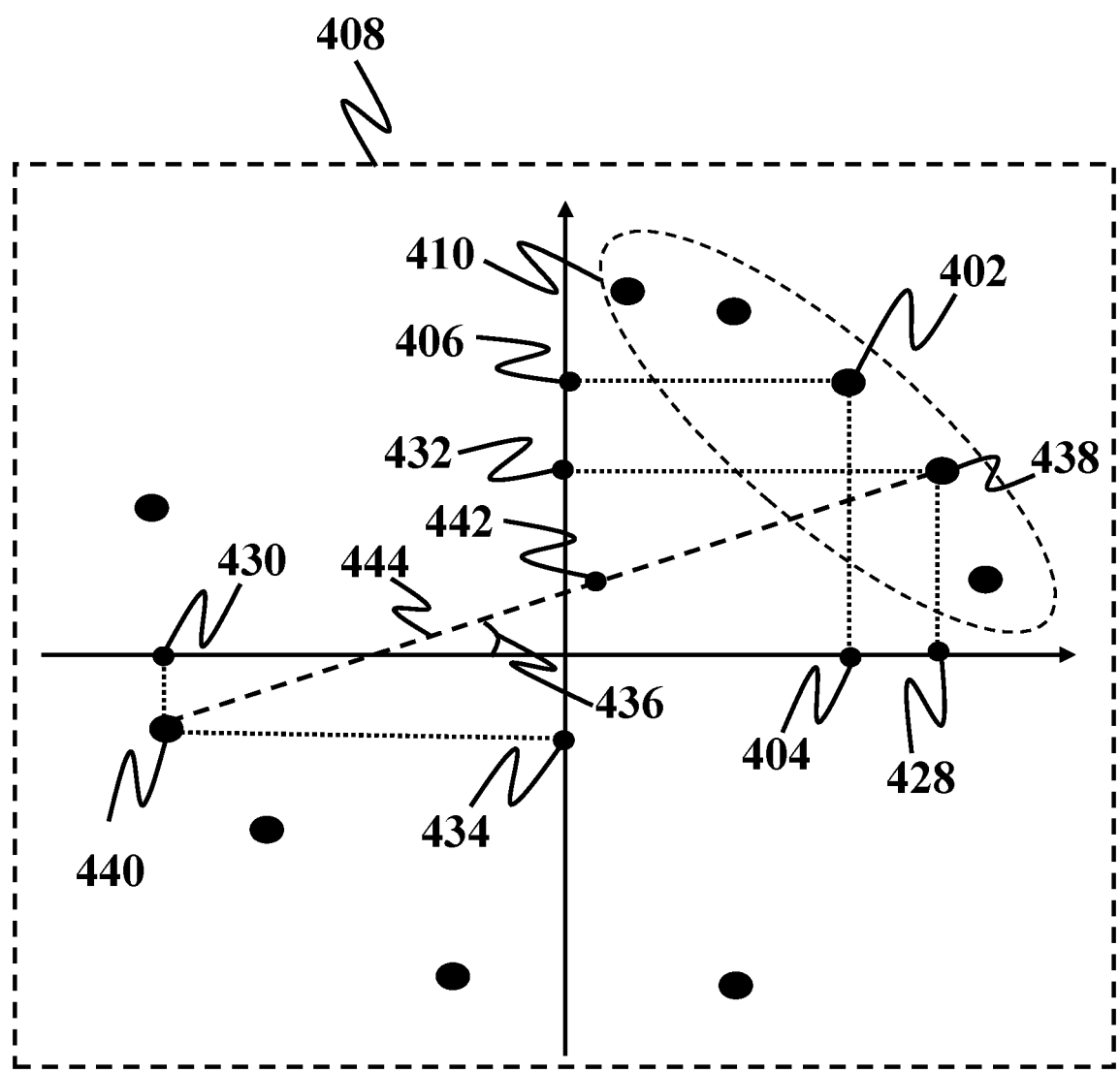
FIG. 4A shows a first image, consistent with one or more exemplary embodiments of the present disclosure.

For further detail with regards to step 106, FIG. 4A shows a first image of an optical marker, consistent with one or more exemplary embodiments of the present disclosure. In an exemplary embodiment, step 106 may include capturing the plurality of images. In an exemplary embodiment, capturing the plurality of images may include capturing a first image 400 of optical marker 202. An exemplary first image 400 may be captured from imaging device 204. An exemplary first image 400 may be captured utilizing imaging device 204. In an exemplary embodiment, capturing first image 400 may include capturing first image 400 in a time interval (0,T).

Figure 5A:
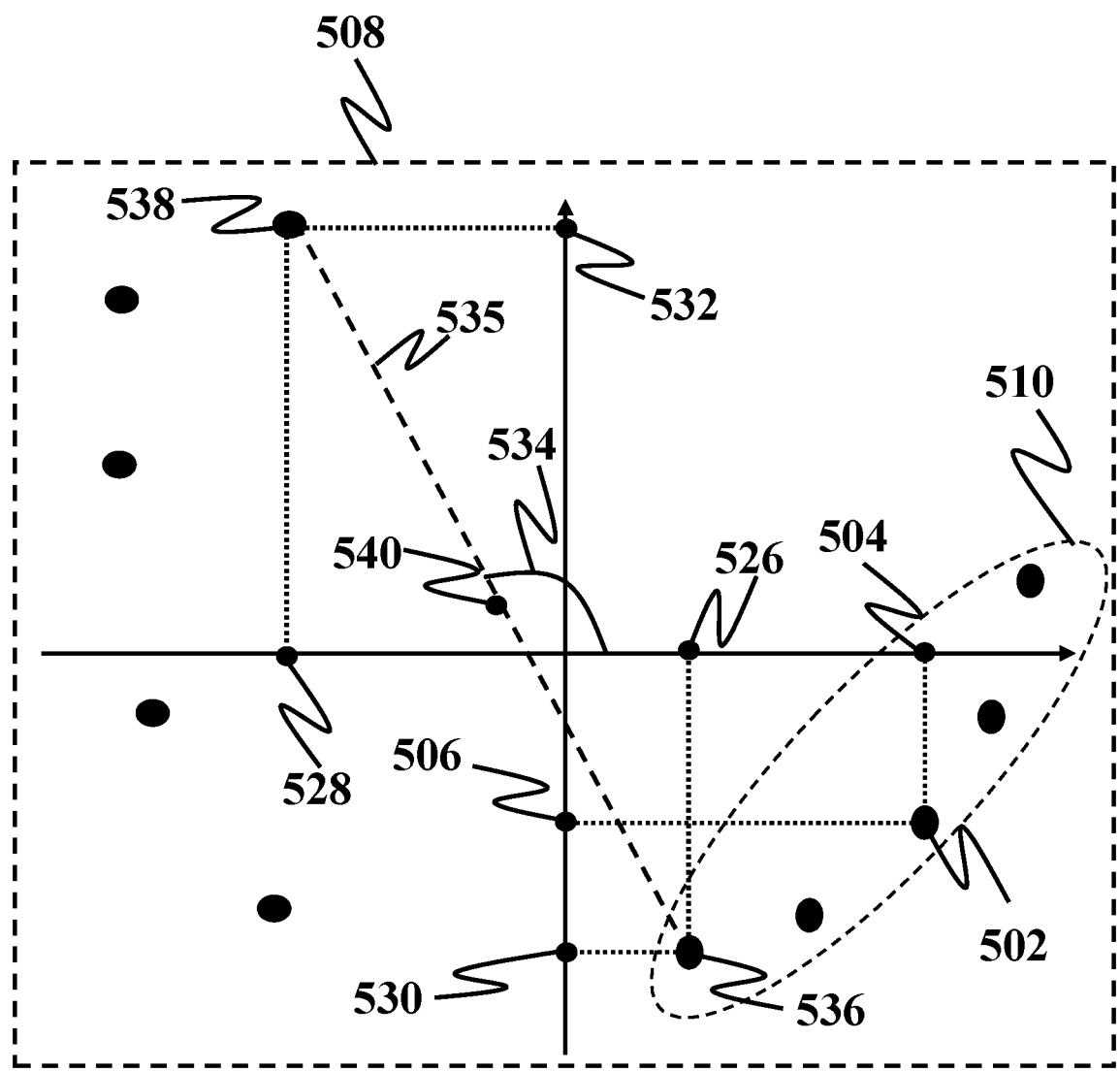
FIG. 5A shows a second image, consistent with one or more exemplary embodiments of the present disclosure.

FIG. 5A shows a second image of an optical marker, consistent with one or more exemplary embodiments of the present disclosure. In an exemplary embodiment, capturing the plurality of images may further include capturing a second image 500 of optical marker 202. An exemplary second image 500 may be captured from imaging device 204. An exemplary second image 500 may be captured utilizing imaging device 204. In an exemplary embodiment, capturing second image 500 may include capturing second image 400 in a time interval ($t_d$, T+$t_d$), where $t_d$ is a time difference between capturing first image 400 and capturing second image 500.

Figure 6:
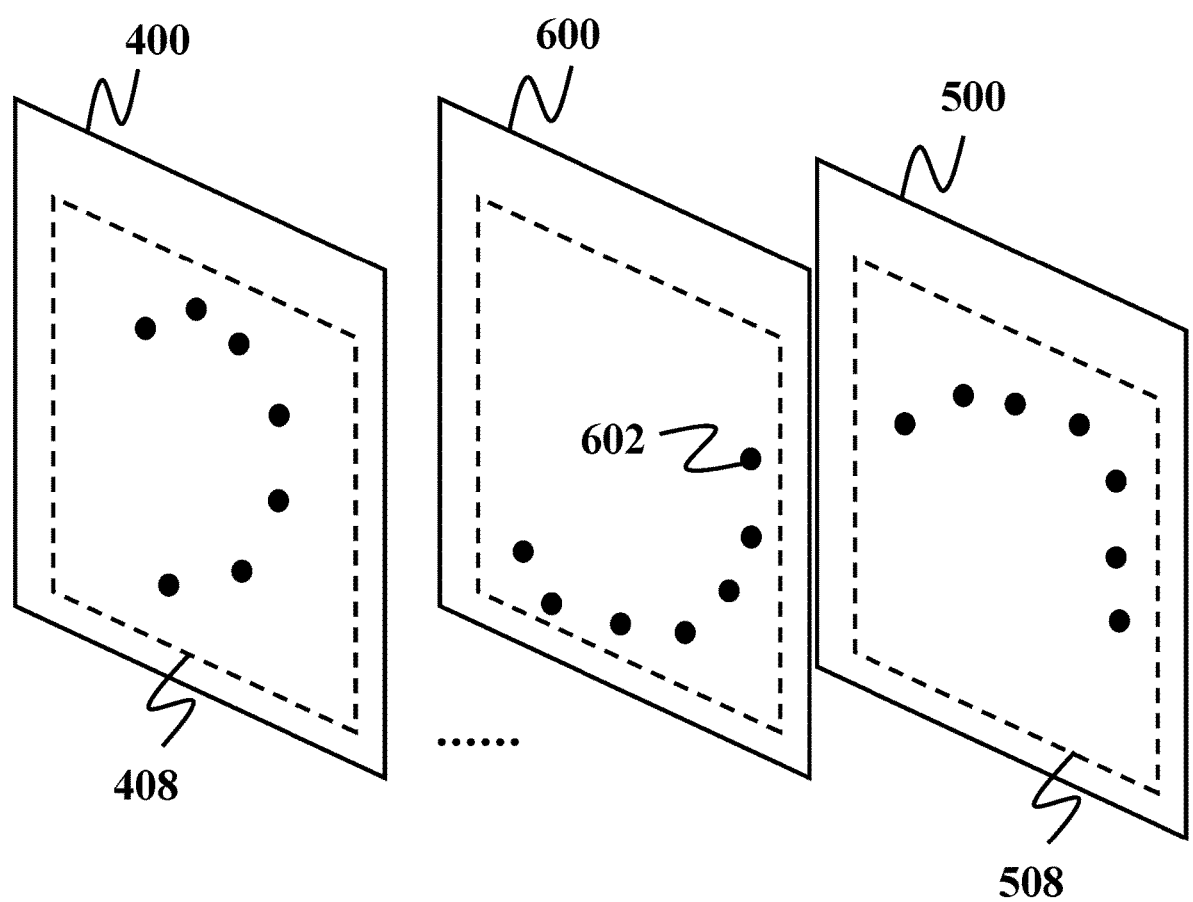
FIG. 6 shows a plurality of images, consistent with one or more exemplary embodiments of the present disclosure.

FIG. 6 shows a plurality of images of an optical marker, consistent with one or more exemplary embodiments of the present disclosure. In an exemplary embodiment, capturing the plurality of images may further include capturing a third image 600. In an exemplary embodiment, third image 600 of optical marker 202 may be captured from imaging device 204. In an exemplary embodiment, third image 600 may be captured in a time interval ($t_d$–T,$t_d$). In an exemplary embodiment, second image 500 may not be captured immediately after first image 400. In an exemplary embodiment, a plurality of images may be captured in a time interval (T,$t_d$+T). An exemplary third image 600 may be captured immediately prior to second image 500. In an exemplary embodiment, $i^{th}$ optical source set 236 may not be excited in the time interval (T,$t_d$+T). An exemplary third image 600 may be captured during an excitation of $(M,j)^{th}$ optical source 239.

Figure 1D:
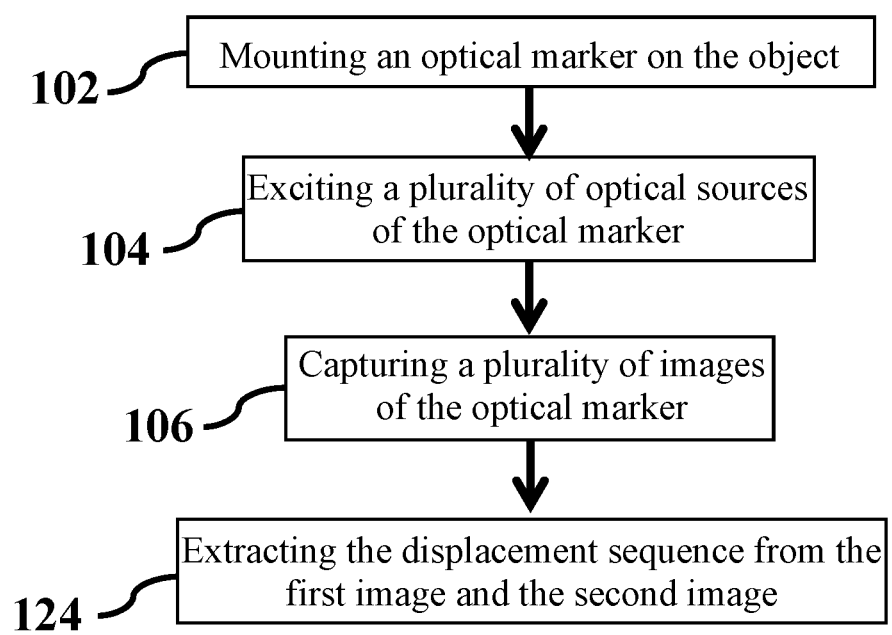
FIG. 1D shows a flowchart of another method for estimating a displacement of an object, consistent with one or more exemplary embodiment of the present disclosure.

FIG. 1D shows a flowchart of a second method for estimating a displacement of an object, consistent with one or more exemplary embodiment of the present disclosure. An exemplary method 100B may include a second implementation of a method for estimating the displacement sequence of object 209. In an exemplary embodiment, FIG. 1D provides exemplary details of method 100B. In an exemplary embodiment, method 100B may include steps of method 100A and some additional exemplary steps. In an exemplary embodiment, method 100B may further include extracting the displacement sequence from first image 400 and second image 500 (step 124).

Figure 1E:
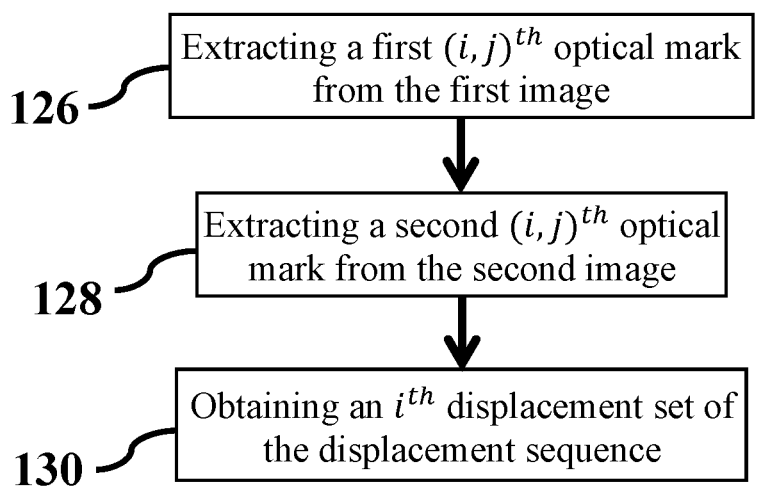
FIG. 1E shows a flowchart of a method for extracting a displacement sequence, consistent with one or more exemplary embodiment of the present disclosure.

For further detail regarding step 124, FIG. 1E shows a flowchart of a method for extracting a displacement sequence, consistent with one or more exemplary embodiment of the present disclosure. In an exemplary embodiment, extracting the displacement sequence may include extracting a first $(i,j)^{th}$ optical mark from first image 400 (step 126), extracting a second $(i,j)^{th}$ optical mark from second image 500 (step 128), and obtaining an $i^{th}$ displacement set of the displacement sequence (step 130).

Referring again to FIG. 4A, in an exemplary embodiment, step 126 may include extracting a first $(i,j)^{th}$ optical mark 402 from first image 400. An exemplary first $(i,j)^{th}$ optical mark 402 may be generated from a respective optical source at first $i^{th}$ moment $T_{1i}$ and with the $j^{th}$ optical feature. An exemplary first $(i,j)^{th}$ optical mark 402 may include a first $(i,j)^{th}$ horizontal position 404 of a plurality of horizontal positions of optical marker 202 and a first $(i,j)^{th}$ vertical position 406 of a plurality of vertical positions of optical marker 202.

Figure 1F:
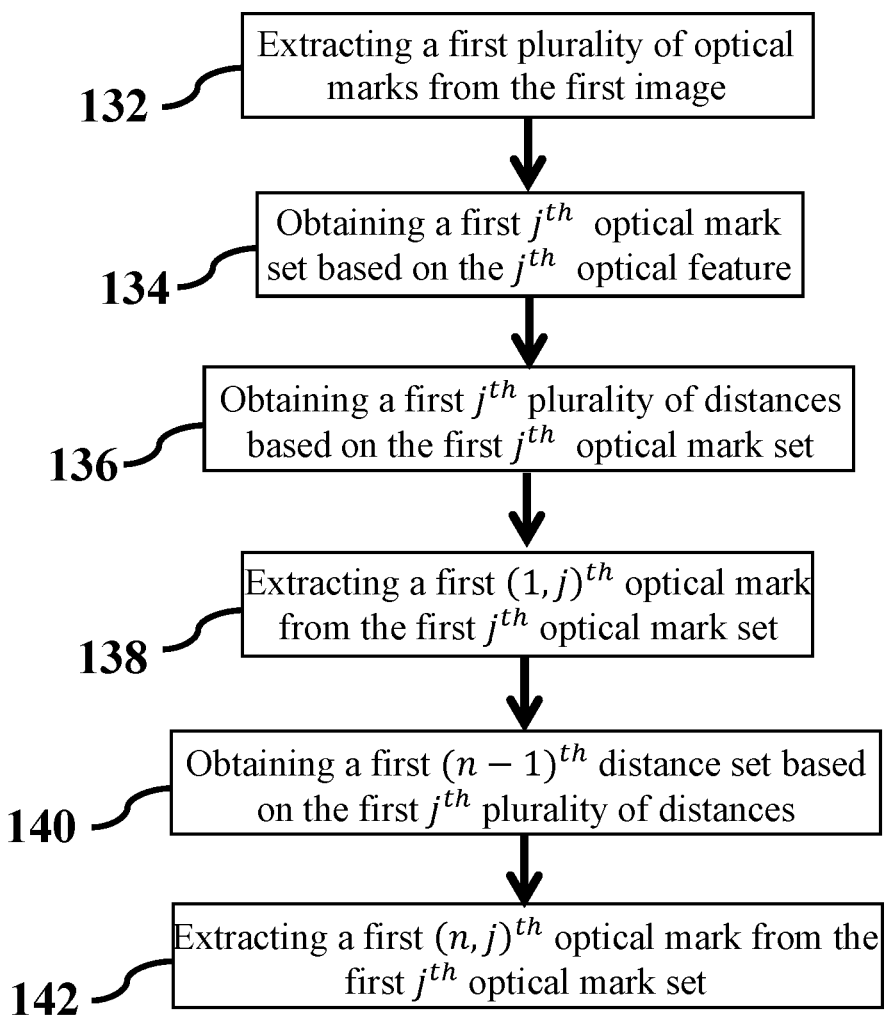
FIG. 1F shows a flowchart of a method for extracting a first optical mark, consistent with one or more exemplary embodiment of the present disclosure.

In further detail with respect to step 126, FIG. 1F shows a flowchart of a method for extracting a first optical mark, consistent with one or more exemplary embodiment of the present disclosure. In an exemplary embodiment, extracting first $(i,j)^{th}$ optical mark 402 from first image 400 may include extracting a first plurality of optical marks from first image 400 (step 132), obtaining a first $j^{th}$ optical mark set (step 134), obtaining a first $j^{th}$ plurality of distances (step 136), extracting a first $(1,j)^{th}$ optical mark from the first $j^{th}$ optical mark set (step 138), obtaining a first $(n-1)^{th}$ distance set (step 140), and extracting a first $(n,j)^{th}$ optical mark from the first $j^{th}$ optical mark set (step 142). In an exemplary embodiment, an $(i,j)^{th}$ optical source of plurality of optical sources 208 may be excited at first $i^{th}$ moment $T_{1i}$ for $\Delta T$ seconds. Consequently, the $(i,j)^{th}$ optical source may emit a respective light during excitation. In an exemplary embodiment, a respective emitted light of the $(i,j)^{th}$ optical source may be captured by imaging device 204. As a result, the emitted light of the $(i,j)^{th}$ optical source may generate first $(i,j)^{th}$ optical mark 402 in first image 400.

Referring to FIGS. 1F and 4A, in an exemplary embodiment, step 132 may include extracting a first plurality of optical marks 408 from first image 400. In an exemplary embodiment, each optical mark of first plurality of optical marks 408 may be generated by a respective optical source of plurality of optical sources 208. In an exemplary embodiment, first plurality of optical marks 408 may be extracted from first image 400 by applying several image-processing techniques such as thresholding, edge detection, and boundary fitting. In an exemplary embodiment, thresholding may provide a binary image from a full color image such as first image 400. Specifically, thresholding may be utilized for separating a number of foreground pixels from a number of background pixels. In an exemplary embodiment, edge detection may extract a number of regions in first image 400 with discontinuities in a brightness of adjacent pixels of respective regions. In an exemplary embodiment, boundary fitting may be referred to as a process of extracting a boundary of a region with high brightness in first image 400 and fitting a curve on an extracted boundary.

In an exemplary embodiment, step 134 may include obtaining a first $j^{th}$ optical mark set 410. In an exemplary embodiment, first $j^{th}$ optical mark set 410 may include first $(i,j)^{th}$ optical mark 402. An exemplary first $j^{th}$ optical mark set 410 may be obtained by selecting a subset of first plurality of optical marks 408 that includes the $j^{th}$ optical feature. Specifically, in an exemplary embodiment, first $j^{th}$ optical mark set 410 may be obtained by selecting optical marks of first plurality of optical marks 408 including the $j^{th}$ optical feature such as a $j^{th}$ color, a $j^{th}$ level of brightness, or a $j^{th}$ size. For example, when the $j^{th}$ optical feature includes the $j^{th}$ color, an optical mark of first plurality of optical marks 408 that includes the $j^{th}$ color may be selected as an element of first $j^{th}$ optical mark set 410.

Figure 4B:
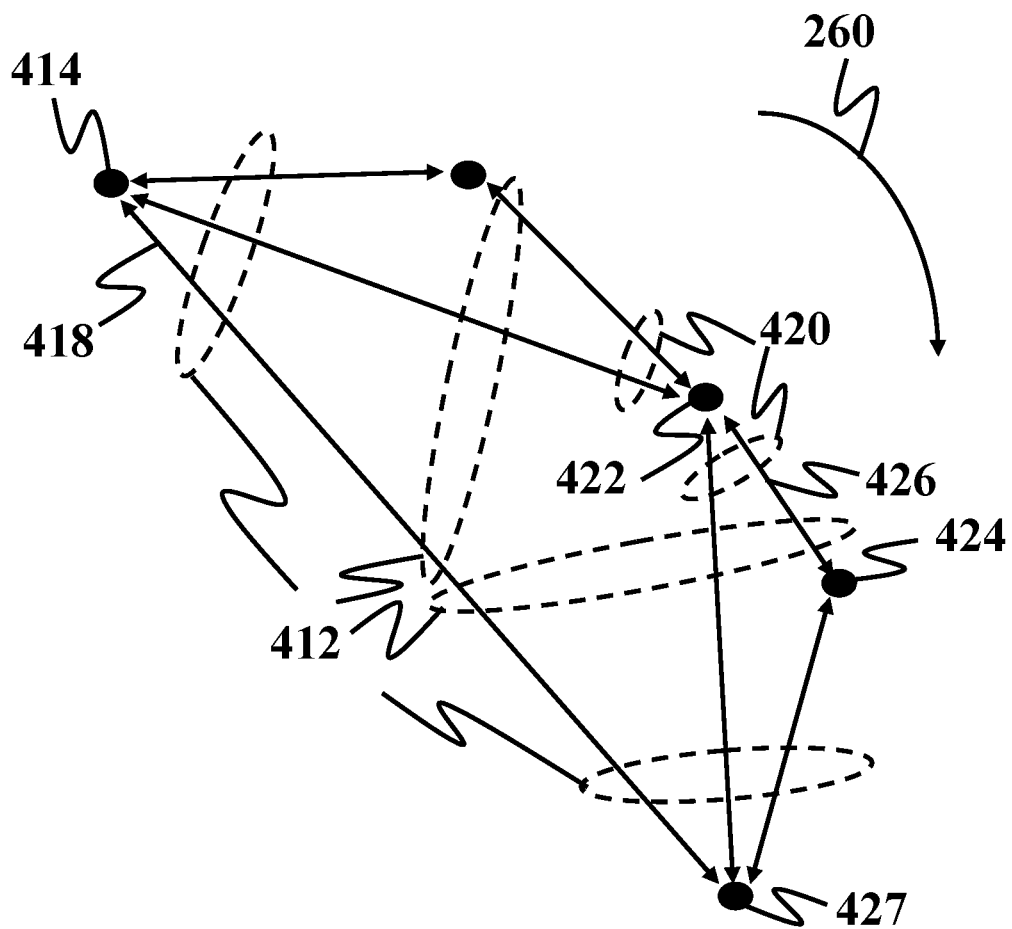
FIG. 4B shows a first optical mark set, consistent with one or more exemplary embodiments of the present disclosure.

FIG. 4B shows a first optical mark set, consistent with one or more exemplary embodiments of the present disclosure. In an exemplary embodiment, step 136 may include obtaining a first $j^{th}$ plurality of distances 412. In an exemplary embodiment, first $j^{th}$ plurality of distances 412 may be obtained by obtaining each distance of first $j^{th}$ plurality of distances 412. In an exemplary embodiment, each distance of first $j^{th}$ plurality of distances 412 may be obtained by calculating a distance between optical marks in a respective pair of optical marks in first $j^{th}$ optical mark set 410.

In an exemplary embodiment, step 138 may include extracting a first $(1,j)^{th}$ optical mark 414 from first $j^{th}$ optical mark set 410. Referring to FIGS. 2B and 4B, an exemplary first $(1,j)^{th}$ optical mark 414 may be extracted based on a $j^{th}$ direction 260. In an exemplary embodiment, $j^{th}$ direction 206 may determine a direction of $j^{th}$ cycle graph 212. An exemplary first $(1,j)^{th}$ optical mark 414 may include a largest distance 418 of first $j^{th}$ plurality of distances 412. In an exemplary embodiment, inequality $d_{N1} > d_{sv}$ may imply that a distance between $(1,j)^{th}$ node 226 and $(N,j)^{th}$ node 230 may be larger than any other pair of nodes in $j^{th}$ cycle graph 212. As a result, two optical marks including largest distance 418 may include first $(1,j)^{th}$ optical mark 414 and an $(N,j)^{th}$ optical mark 427 generated by an optical source located at $(N,j)^{th}$ node 230. Therefore, $(1,j)^{th}$ optical mark 414 and $(N,j)^{th}$ optical mark 427 may be extracted from first $j^{th}$ optical mark set 410 by finding a pair of optical marks in first $j^{th}$ optical mark set 410 with largest distance to each other. On the other hand, $j^{th}$ direction 260 may determine an order of excitation of optical sources. Therefore, $(1,j)^{th}$ optical mark 414 and $(N,j)^{th}$ optical mark 427 may be obtained according to $j^{th}$ direction 260. For example, in an exemplary embodiment, when $j^{th}$ direction 260 is clockwise, $(1,j)^{th}$ optical mark 414 may be extracted from an optical mark located at a node with a smaller clock number. In contrast, when $j^{th}$ direction 260 is counter clockwise, $(1,j)^{th}$ optical mark 414 may be extracted from an optical mark located at a node with a larger clock number.

In an exemplary embodiment, step 140 may include obtaining a first $(n-1)^{th}$ distance set 420. In an exemplary embodiment, obtaining first $(n-1)^{th}$ distance set 420 may include obtaining each distance in first $(n-1)^{th}$ distance set 420. In an exemplary embodiment, each distance in first $(n-1)^{th}$ distance set 420 may be obtained by calculating a distance of a first $(n-1,j)^{th}$ optical mark 422 in first $j^{th}$ optical mark set 410 and other optical marks in first $j^{th}$ optical mark set 410 where $2 \le n \le N$.

In an exemplary embodiment, step 142 may include extracting a first $(n,j)^{th}$ optical mark 424 from first $j^{th}$ optical mark set 410. An exemplary first $(n,j)^{th}$ optical mark 424 may be extracted by finding a smallest distance 426 in first $(n-1)^{th}$ distance set 420. As a result, in an exemplary embodiment, first $(n,j)^{th}$ optical mark 424 may be extracted by finding an optical mark in first $j^{th}$ optical mark set 410 with smallest distance 426 from first $(n-1,j)^{th}$ optical mark 422. In an exemplary embodiment, each two adjacent nodes in $j^{th}$ cycle graph 212 may include a smallest distance from other nodes in $j^{th}$ cycle graph 212. As a result, a pair of optical marks generated by optical sources located at a pair of nodes in $j^{th}$ cycle graph 212 may include a smallest distance from other optical marks in first $j^{th}$ optical mark set 410. Therefore, first $(n,j)^{th}$ optical mark 424 may be obtained by finding an optical mark with smallest distance from first $(n-1,j)^{th}$ optical mark 422.

Referring again to FIG. 5A, in an exemplary embodiment, step 128 may include extracting a second $(i,j)^{th}$ optical mark 502 from second image 500. An exemplary second $(i,j)^{th}$ optical mark 502 may be generated by a respective optical source at second $i^{th}$ moment $T_{2i}$ and with the $j^{th}$ optical feature. In an exemplary embodiment, second $(i,j)^{th}$ optical mark 502 may include a second $(i,j)^{th}$ horizontal position 504 of the plurality of horizontal positions and a second $(i,j)^{th}$ vertical position 506 of the plurality of vertical positions. In an exemplary embodiment, the $(i,j)^{th}$ optical source may be excited at second $i^{th}$ moment $T_{2i}$ for $\Delta T$ seconds. Consequently, the $(i,j)^{th}$ optical source may emit a respective light during excitation. In an exemplary embodiment, a respective emitted light of the $(i,j)^{th}$ optical source may be captured by imaging device 204. As a result, the emitted light of the $(i,j)^{th}$ optical source may generate second $(i,j)^{th}$ optical mark 502 in second image 500.

In an exemplary embodiment, the displacement sequence of object 209 may be calculated with respect to a center point of optical marker 202. An exemplary center point of optical marker 202 may include an average horizontal position of optical marker 202 and an average vertical position of optical marker 202. An exemplary center point may be calculated based on the plurality of horizontal positions and the plurality of vertical positions. In an exemplary embodiment, a respective plurality of optical marks may be extracted from each of the plurality of images. In an exemplary embodiment, each optical mark in a respective plurality of optical marks may include a respective horizontal position of the plurality of horizontal positions. Similarly, in an exemplary embodiment, each optical mark in a respective plurality of optical marks may include a respective vertical position of the plurality of vertical positions. In an exemplary embodiment, the average horizontal position may be obtained by calculating an average of the plurality of horizontal positions. Moreover, in an exemplary embodiment, the average vertical position may be obtained by calculating an average of the plurality of vertical positions.

Figure 1G:
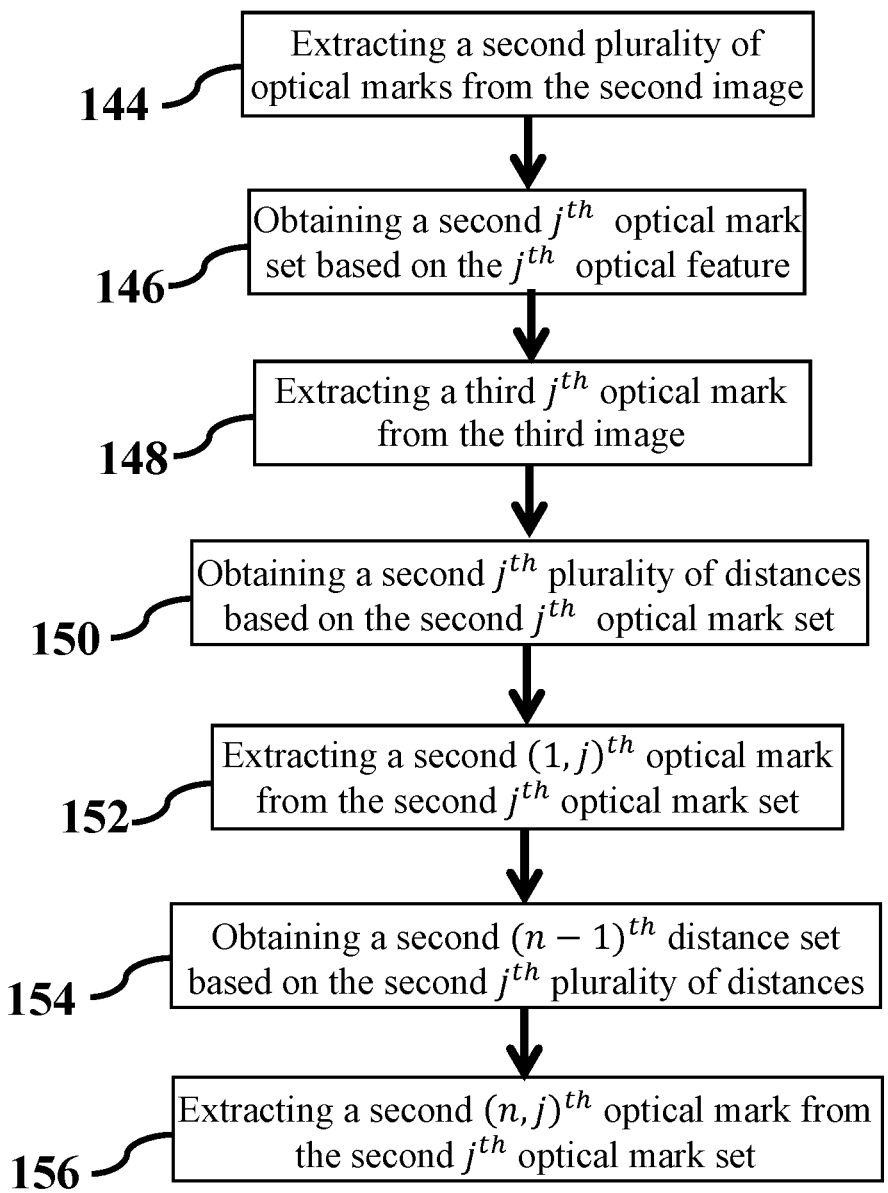
FIG. 1G shows a flowchart of a method for extracting a second optical mark, consistent with one or more exemplary embodiment of the present disclosure.
Figure 1H:
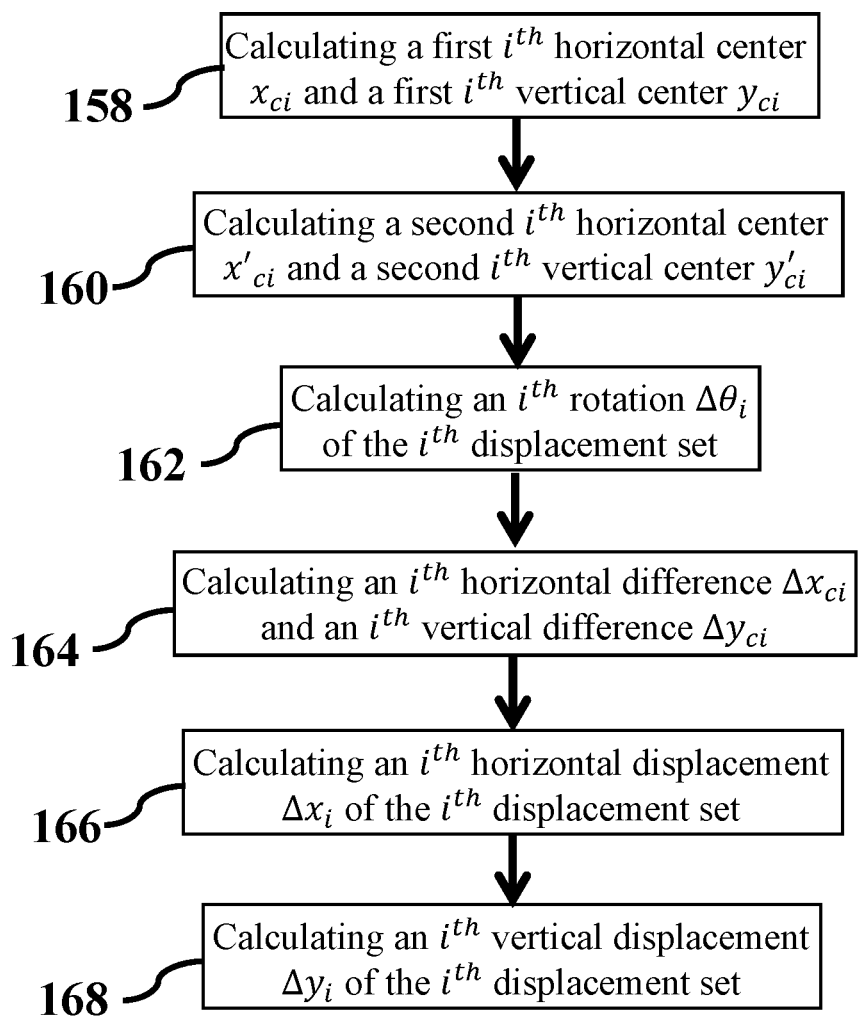
FIG. 1H shows a flowchart of a method for obtaining a displacement set, consistent with one or more exemplary embodiment of the present disclosure.

For further detail with respect to step 128, FIG. 1G shows a flowchart of a method for extracting a second optical mark, consistent with one or more exemplary embodiment of the present disclosure. In an exemplary embodiment, extracting second $(i,j)^{th}$ optical mark 502 may include extracting a second plurality of optical marks from the second image (step 144), obtaining a second $j^{th}$ optical mark set (step 146), extracting a third $j^{th}$ optical mark from the third image (step 148), obtaining a second $j^{th}$ plurality of distances (step 150), extracting a second $(1,j)^{th}$ optical mark from the second $j^{th}$ optical mark set (step 152), obtaining a second $(n-1)^{th}$ distance set based on the second $j^{th}$ plurality of distances (step 154), and extracting a second $(n,j)^{th}$ optical mark from the second $j^{th}$ optical mark set (step 156).

Referring to FIGS. 1G, 5A, and 6, in an exemplary embodiment, step 144 may include extracting a second plurality of optical marks 508 from second image 500. In an exemplary embodiment, each optical mark of second plurality of optical marks 508 may be generated by a respective optical source of plurality of optical sources 208. In an exemplary embodiment, second plurality of optical marks 508 may be extracted from second image 500 by applying several image-processing techniques such as thresholding, edge detection, and boundary fitting. In an exemplary embodiment, thresholding may provide a binary image from a full color image such as second image 500. In an exemplary embodiment, edge detection may extract a number of regions in second image 500 with discontinuities in a brightness of adjacent pixels of respective regions. In an exemplary embodiment, boundary fitting may be referred to as a process of extracting a boundary of a region with high brightness in second image 500 and fitting a curve on an extracted boundary.

In an exemplary embodiment, step 146 may include obtaining a second $j^{th}$ optical mark set 510. In an exemplary embodiment, second $j^{th}$ optical mark set 510 may include second $(i,j)^{th}$ optical mark 502. An exemplary second $j^{th}$ optical mark set 510 may be obtained by selecting a subset of second plurality of optical marks 508 that includes the $j^{th}$ optical feature. Specifically, in an exemplary embodiment, second $j^{th}$ optical mark set 510 may be obtained by selecting optical marks of second plurality of optical marks 508 including the $j^{th}$ optical feature. In an exemplary embodiment, the $j^{th}$ optical feature may include $j^{th}$ color, a $j^{th}$ level of brightness, or a $j^{th}$ size. For example, when the $j^{th}$ optical feature includes the $j^{th}$ color, an optical mark of second plurality of optical marks 508 that includes the $j^{th}$ color may be selected as an element of second $j^{th}$ optical mark set 410.

In an exemplary embodiment, step 148 may include extracting a third $j^{th}$ optical mark 602 from third image 600. In an exemplary embodiment, third $j^{th}$ optical mark 602 may be generated by $(M,j)^{th}$ optical source 239. In an exemplary embodiment, $(M,j)^{th}$ optical source 239 may be excited at a third moment $t_d - T/N$ for $\Delta T$ seconds. Consequently, $(M,j)^{th}$ optical source 239 may emit a light during excitation. In an exemplary embodiment, an emitted light of $(M,j)^{th}$ optical source 239 may be captured by imaging device 204. As a result, the emitted light of the $(M,j)^{th}$ optical source 239 may generate third $j^{th}$ optical mark 602 in third image 600. As a result, in an exemplary embodiment, third $j^{th}$ optical mark 602 may be extracted from third image 600 by applying several image-processing techniques such as thresholding, edge detection, and boundary fitting.

Figure 5B:
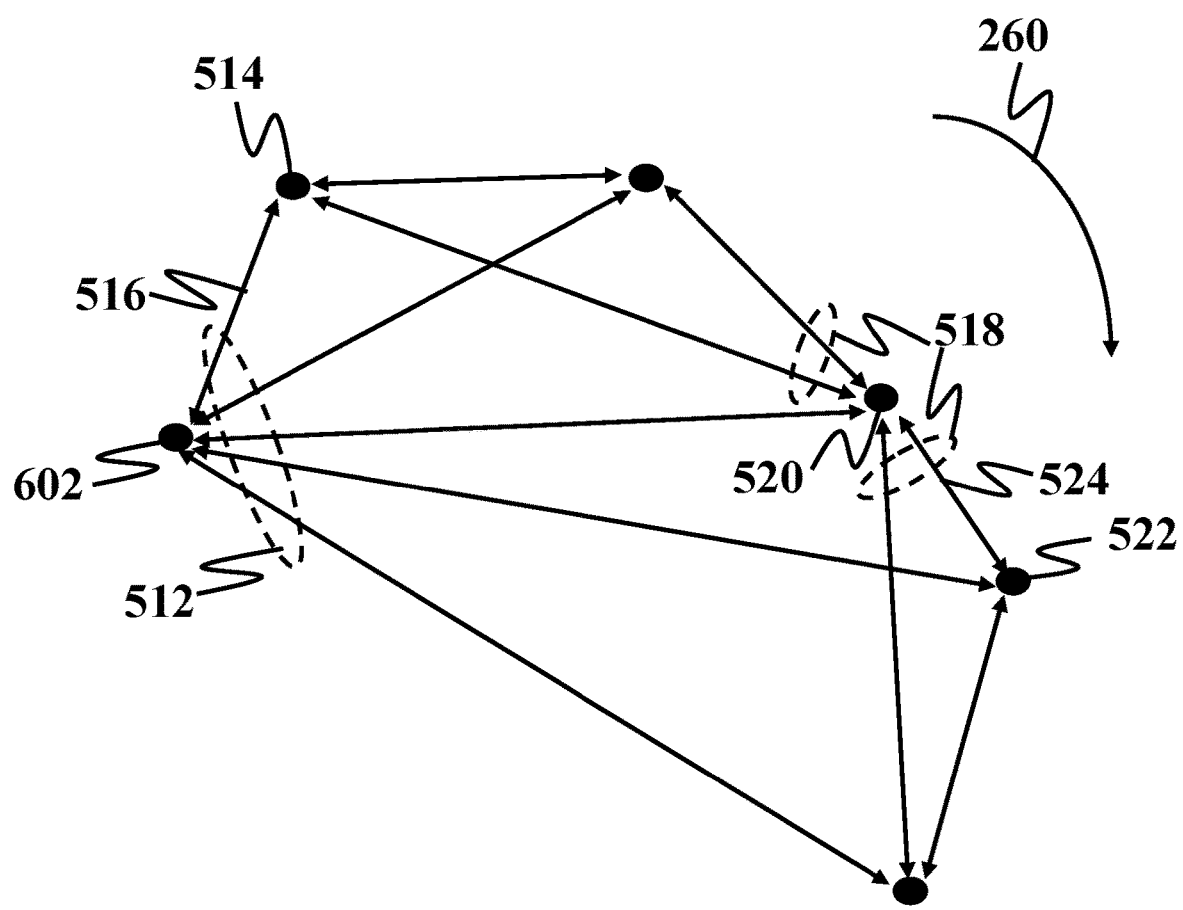
FIG. 5B shows a second optical mark set, consistent with one or more exemplary embodiments of the present disclosure.

FIG. 5B shows a second optical mark set, consistent with one or more exemplary embodiments of the present disclosure. In an exemplary embodiment, step 150 may include obtaining a second $j^{th}$ plurality of distances 512. In an exemplary embodiment, second $j^{th}$ plurality of distances 512 may be obtained by obtaining each distance of second $j^{th}$ plurality of distances 512. In an exemplary embodiment, each distance of second $j^{th}$ plurality of distances 512 may be obtained by calculating a distance between a respective optical mark in second $j^{th}$ optical mark set 510 and third $j^{th}$ optical mark 602.

In an exemplary embodiment, step 152 may include extracting a second $(1,j)^{th}$ optical mark 514 from second $j^{th}$ optical mark set 510. In an exemplary embodiment, second $(1,j)^{th}$ optical mark 514 may be extracted from second $j^{th}$ optical mark set 510 by finding a an optical mark in second $j^{th}$ optical mark set 510 with a smallest distance from third $j^{th}$ optical mark 602. In other words, in an exemplary embodiment, second $(1,j)^{th}$ optical mark 514 may include one of optical marks in a pair with a smallest distance 516 of second $j^{th}$ plurality of distances 512.

In an exemplary embodiment, step 154 may include obtaining a second $(n-1)^{th}$ distance set 518. In an exemplary embodiment, obtaining second $(n-1)^{th}$ distance set 518 may include obtaining each distance in second $(n-1)^{th}$ distance set 518. In an exemplary embodiment, each distance in second $(n-1)^{th}$ distance set 518 may be obtained by calculating a distance between a second $(n-1,j)^{th}$ optical mark 520 in second $j^{th}$ optical mark set 510 and other optical marks in second $j^{th}$ optical mark set 510.

In an exemplary embodiment, step 156 may include extracting a second $(n,j)^{th}$ optical mark 522 from second $j^{th}$ optical mark set 510. An exemplary second $(n,j)^{th}$ optical mark 522 may be extracted by finding a smallest distance 524 in second $(n-1)^{th}$ distance set 518. As a result, in an exemplary embodiment, second $(n,j)^{th}$ optical mark 522 may be extracted by finding an optical mark in second $j^{th}$ optical mark set 510 with smallest distance 524 from second $(n-1,j)^{th}$ optical mark 520. In an exemplary embodiment, each two adjacent nodes in $j^{th}$ cycle graph 212 may include a smallest distance from other nodes in $j^{th}$ cycle graph 212. As a result, a pair of optical marks generated by optical sources located at a pair of nodes in $j^{th}$ cycle graph 212 may include a smallest distance from other optical marks in second $j^{th}$ optical mark set 510. Therefore, second $(n,j)^{th}$ optical mark 522 may be obtained by finding an optical mark with smallest distance from second $(n-1,j)^{th}$ optical mark 520.

In further detail with respect to step 130, FIG. 1I shows a flowchart of a method for obtaining a displacement set, consistent with one or more exemplary embodiment of the present disclosure. In an exemplary embodiment, obtaining the $i^{th}$ displacement set may include calculating a first $i^{th}$ horizontal center $x_{ci}$ of optical marker 202 and a first $i^{th}$ vertical center $y_{ci}$ of optical marker 202 (step 158), calculating a second $i^{th}$ horizontal center $x'_{ci}$ of optical marker 202 and a second $i^{th}$ vertical center $y'_{ci}$ of optical marker 202 (step 160), calculating an $i^{th}$ rotation $\Delta\theta_i$ of the $i^{th}$ displacement set (step 162), calculating an $i^{th}$ horizontal difference $\Delta x_{ci}$ and an $i^{th}$ vertical difference $\Delta y_{ci}$ (step 164), calculating an $i^{th}$ horizontal displacement $\Delta x_i$ of the $i^{th}$ displacement set (step 166), and calculating an $i^{th}$ vertical displacement $\Delta y_i$ of the $i^{th}$ displacement set (step 168).

Referring again to FIGS. 4A and 5A, in an exemplary embodiment, step 158 may include calculating a first $i^{th}$ horizontal center $x_{ci}$ of optical marker 202 and a first $i^{th}$ vertical center $y_{ci}$ of optical marker 202. In an exemplary embodiment, a first $i^{th}$ center 442 of optical marker 202 may be a midpoint of a line segment connecting first $(1,i)^{th}$ optical marker 438 and first $(2,i)^{th}$ optical marker 440. In an exemplary embodiment, first $i^{th}$ center 442 may be considered as a position of optical marker 202 at first $i^{th}$ moment $T_{1i}$. In an exemplary embodiment, first $i^{th}$ center 442 may include the first $i^{th}$ horizontal center $x_{ci}$ and the first $i^{th}$ vertical center $y_{ci}$. In an exemplary embodiment, the first $i^{th}$ horizontal center $x_{ci}$ and the first $i^{th}$ vertical center $y_{ci}$ may be calculated according to a set of operations defined by:

$$x_{ci}=(x_{i1}+x_{i2})/2, \text{ and} \qquad \text{Equation (1)}$$

$$y_{ci}=(y_{i1}+y_{i2})/2, \qquad \text{Equation (2)}$$

where $x_{i1}$ is a first $(i,1)^{th}$ horizontal position 428 of the plurality of horizontal positions, $x_{i2}$ is a first $(i,2)^{th}$ horizontal position 430 of the plurality of horizontal positions, $y_{i1}$ is a first $(i,1)^{th}$ vertical position 432 of the plurality of vertical positions, and $y_{i2}$ is a first $(i,2)^{th}$ vertical position 434 of the plurality of vertical positions.

In an exemplary embodiment, step 160 may include calculating a second $i^{th}$ horizontal center $x'_{ci}$ of optical marker 202 and a second $i^{th}$ vertical center $y'_{ci}$ of optical marker 202. In an exemplary embodiment, a second $i^{th}$ center 540 of optical marker 202 may be a midpoint of a line segment connecting second $(1,i)^{th}$ optical marker 536 and second $(2,i)^{th}$ optical marker 538. In an exemplary embodiment, second $i^{th}$ center 540 may be considered as a position of optical marker 202 at second $i^{th}$ moment $T_{2i}$. In an exemplary embodiment, second $i^{th}$ center 540 may include the second $i^{th}$ horizontal center $x'_{ci}$ and the second $i^{th}$ vertical center $y'_{ci}$. In an exemplary embodiment, the second $i^{th}$ horizontal center $x'_{ci}$ and the second $i^{th}$ vertical center $y'_{ci}$ may be calculated according to a set of operations defined by:

$$x'_{ci}=(x'_{i1}+x'_{i2})/2, \text{ and} \qquad \text{Equation (3)}$$

$$y'_{ci}=(y'_{i1}+y'_{i2})/2, \qquad \text{Equation (4)}$$

where $x'_{i1}$ is a second $(i,1)^{th}$ horizontal position 526 of the plurality of horizontal positions, $x'_{i2}$ is a second $(i,2)^{th}$ horizontal position 528 of the plurality of horizontal positions, $y'_{i1}$ is a second $(i,1)^{th}$ vertical position 530 of the plurality of vertical positions, and $y'_{i2}$ is a second $(i,2)^{th}$ vertical position 532 of the plurality of vertical positions.

In an exemplary embodiment, step 162 may include calculating an $i^{th}$ rotation $\Delta\theta_i$ of the $i^{th}$ displacement set. A displacement of object 209 between first $i^{th}$ center 442 and second $i^{th}$ center 540 may include two components: a linear movement, and a rotation. In an exemplary embodiment, the $i^{th}$ rotation $\Delta\theta_i$ may be calculated according to a set of operations defined by:

$$\Delta\theta_i = \theta_{2i} - \theta_{1i} = \tan^{-1}\frac{y'_{i2}-y'_{i1}}{x'_{i2}-x'_{i1}} - \tan^{-1}\frac{y_{i2}-y_{i1}}{x_{i2}-x_{i1}}, \qquad \text{Equation (5)}$$

where $\theta_{1i}$ is a first angle 436 and $\theta_{2i}$ is a second angle 534. An exemplary first angle 436 of optical marker 202 may include an angle of a first imaginary line 444 that connects a first $(i,1)^{th}$ optical mark 438 of first plurality of optical marks 408 and a first $(i,2)^{th}$ optical mark 440 of first plurality of optical marks 408. An exemplary second angle 534 of optical marker 202 may include an angle of a second imaginary line 535 that connects a second $(i,1)^{th}$ optical mark 536 of second plurality of optical marks 508 and a second $(i,2)^{th}$ optical mark 538 of second plurality of optical marks 508.

In an exemplary embodiment, step 164 may include calculating an $i^{th}$ horizontal difference $\Delta x_{ci}$ and an $i^{th}$ vertical difference $\Delta y_{ci}$. In an exemplary embodiment, the $i^{th}$ horizontal difference $\Delta x_{ci}$ and the $i^{th}$ vertical difference $\Delta y_{ci}$ may be calculated according to a set of operations defined by:

$$\Delta x_{ci}=x_c-x_{ci}, \qquad \text{Equation (6)}$$

$$\Delta y_{ci}=y_c-y_{ci}, \qquad \text{Equation (7)}$$

where $x_c$ is the average horizontal position and $y_c$ is the average vertical position. A displacement of object 209 between first $i^{th}$ moment $T_{1i}$ and second $i^{th}$ moment $T_{2i}$ may be calculated with respect to a fixed point of optical marker 202.

In an exemplary embodiment, step 166 may include calculating an $i^{th}$ horizontal displacement $\Delta x_i$ of the $i^{th}$ displacement set. In an exemplary embodiment, the $i^{th}$ horizontal displacement $\Delta x_i$ according to a set of operations defined by:

$$\Delta x_i=x'_{ci}-x_c+\Delta x_{ci}\cos\Delta\theta_i-\Delta y_{ci}\sin\Delta\theta_i \qquad \text{Equation (8)}$$

In an exemplary embodiment, step 168 may include calculating an $i^{th}$ vertical displacement $\Delta y_i$ of the $i^{th}$ displacement set. In an exemplary embodiment, the $i^{th}$ vertical displacement $\Delta y_i$ according to a set of operations defined by:

$$\Delta y_i=y'_{ci}-y_c+\Delta x_{ci}\sin\Delta\theta_i+\Delta y_{ci}\cos\Delta\theta_i \qquad \text{Equation (9)}$$

Figure 7:
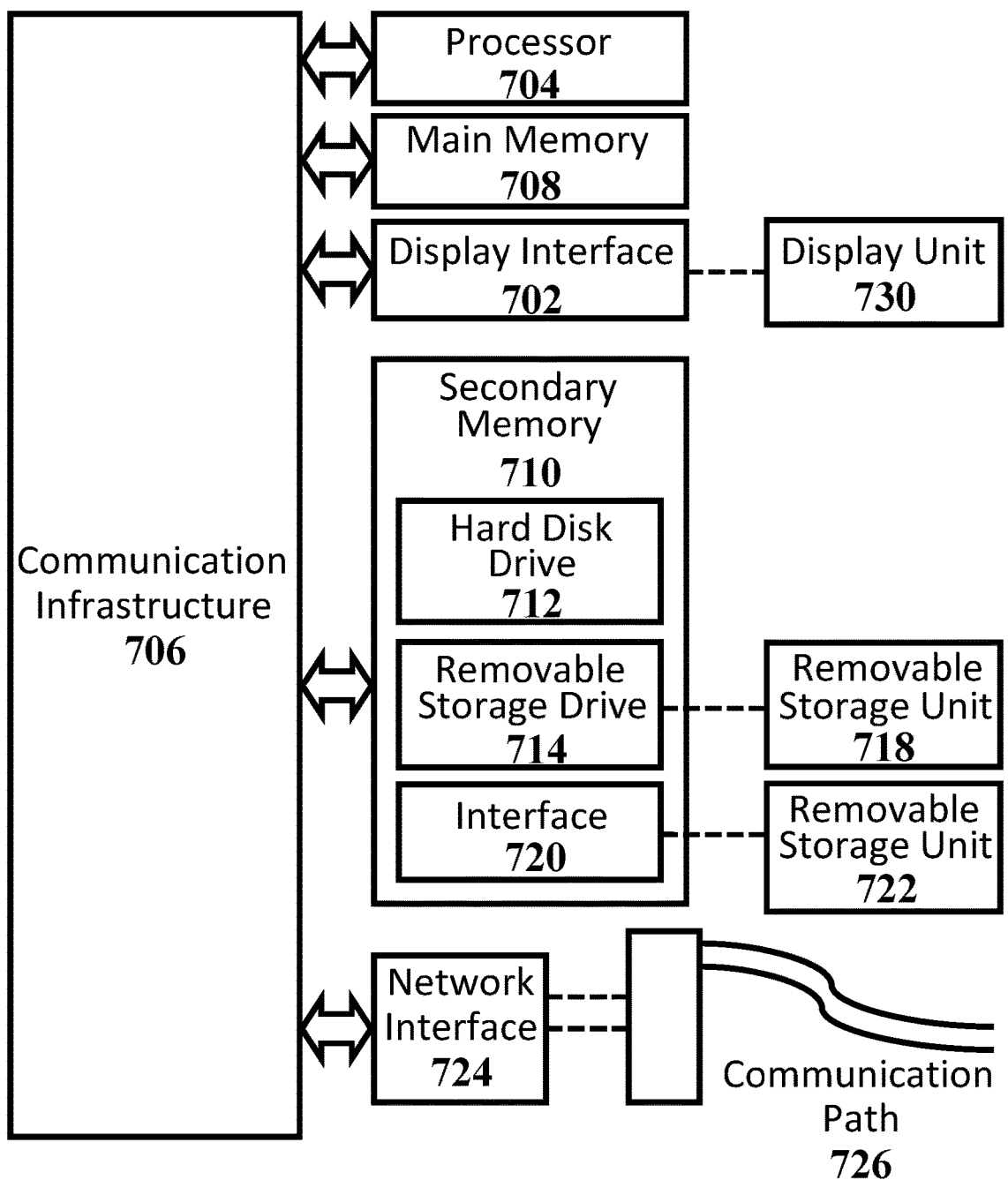
FIG. 7 shows a high-level functional block diagram of a computer system, consistent with one or more exemplary embodiments of the present disclosure.

FIG. 7 shows an example computer system 700 in which an embodiment of the present invention, or portions thereof, may be implemented as computer-readable code, consistent with exemplary embodiments of the present disclosure. For example, different steps of method 100A and method 100B may be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-6.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 704 may be a special purpose (e.g., a graphical processing unit) or a general-purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 may be connected to a communication infrastructure 706, for example, a bus, message queue, network, or multi-core message-passing scheme.

In an exemplary embodiment, computer system 700 may include a display interface 702, for example a video connector, to transfer data to a display unit 730, for example, a monitor. Computer system 700 may also include a main memory 708, for example, random access memory (RAM), and may also include a secondary memory 710. Secondary memory 710 may include, for example, a hard disk drive 712, and a removable storage drive 714. Removable storage drive 714 may include a floppy disk drive, a magnetic tape drive, an optical disk drive, a flash memory, or the like. Removable storage drive 714 may read from and/or write to a removable storage unit 718 in a well-known manner. Removable storage unit 718 may include a floppy disk, a magnetic tape, an optical disk, etc., which may be read by and written to by removable storage drive 714. As will be appreciated by persons skilled in the relevant art, removable storage unit 718 may include a computer usable storage medium having stored therein computer software and/or data.

In alternative implementations, secondary memory 710 may include other similar means for allowing computer programs or other instructions to be loaded into computer system 400. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement different embodiments of the present disclosure as discussed herein. In particular, the computer programs, when executed, enable processor device 704 to implement the processes of the present disclosure, such as the operations in method 100A illustrated by flowchart 100 of FIG. 1A and method 100B illustrated by flowchart of FIG. 1D discussed above. Accordingly, such computer programs represent controllers of computer system 700. Where exemplary embodiments of method 100A and method 100B are implemented using software, the software may be stored in a computer program product and loaded into computer system 700 using removable storage drive 714, interface 720, and hard disk drive 712, or communications interface 724.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Example

Figure 8:
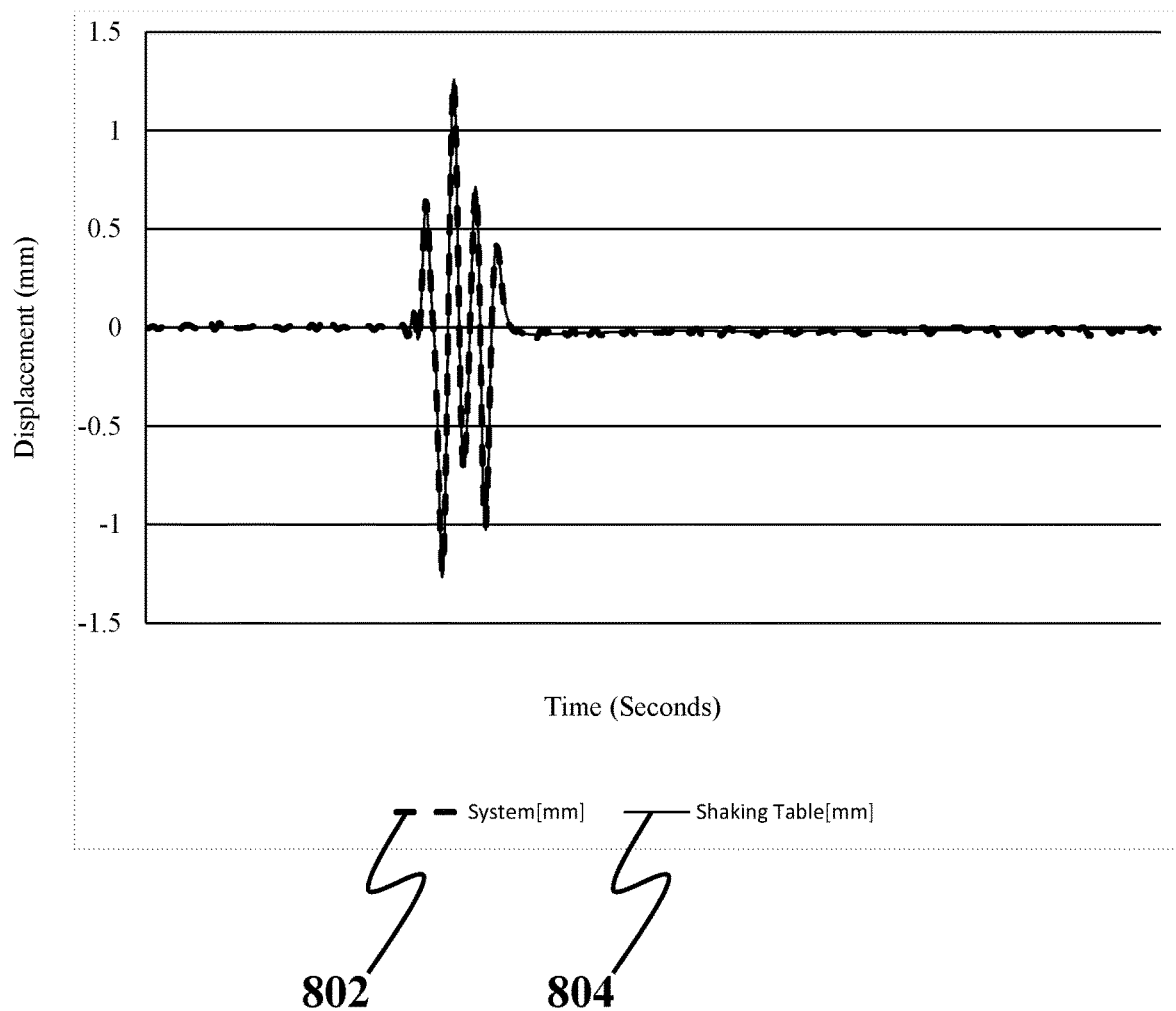
FIG. 8 shows a displacement sequence of an object, consistent with one or more exemplary embodiments of the present disclosure.

In this example, a performance of a method (similar to method 100A and method 100B) for estimating a displacement sequence of an object (similar to object 209) is demonstrated. Different steps of an exemplary method are implemented utilizing a system similar to system 200. An exemplary optical marker (similar to double ring optical marker 202B). A frame rate of an imaging device (similar to imaging device 204) is about 10 frames per second. As a result, an exposure time (similar to exposure time T) of the imaging device is about 100 ms. A number of LEDs are utilized for implementing plurality of optical sources 208. A number of LEDs in an interior ring (similar to fourth cycle graph 252) is equal to 15. A number of LEDs in an exterior ring (similar to fifth cycle graph 254) is equal to 15. LEDs in each ring are equally spaced. The object is placed on a shaking table. The shaking table shakes the object with a predetermined displacement pattern. FIG. 8 shows a displacement sequence of an object, consistent with one or more exemplary embodiments of the present disclosure. As FIG. 8 shows, an estimated displacement sequence 802 of the object (shown by dashed line) accurately and follows a predetermined displacement pattern 804 (shown by a continuous line) with a negligible error.

Figure 9:
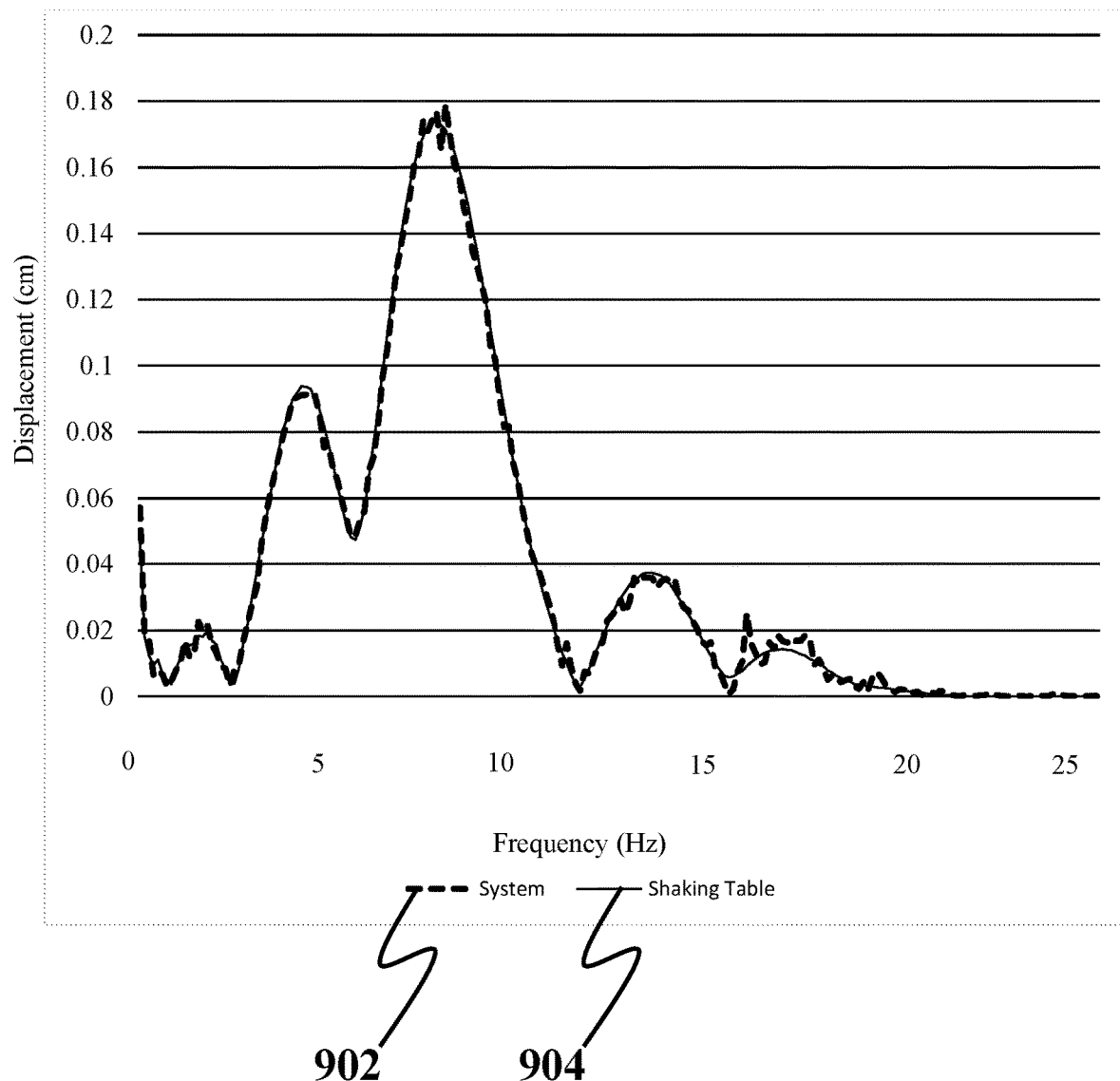
FIG. 9 shows a frequency content of a displacement sequence, consistent with one or more exemplary embodiments of the present disclosure.

FIG. 9 shows a frequency content of a displacement sequence, consistent with one or more exemplary embodiments of the present disclosure. When a sampling rate (that is the frame rate of the imaging device) is about 10 frames per second, a Nyquist rate is about 5 frames per second. However, as in FIG. 9, an exemplary system accurately estimates a displacement 902 of the object (shown by a dashed line) even in frequency components of a predetermined displacement 904 (shown by a continuous line) larger than the Nyquist rate. The same is true for frequency components of the predetermined displacement larger than the frame rate of the imaging device. In other words, in conventional estimators, estimated frequency components of larger than the Nyquist rate are subjected to large errors. However, an exemplary system can accurately estimate frequency components of displacement even when the sampling rate is bounded to Nyquist rate.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for estimating a displacement sequence of an object, the method comprising:

mounting an optical marker on the object, the optical marker comprising a plurality of optical sources;

exciting, utilizing one or more processors, the plurality of optical sources based on an excitation pattern;

capturing, utilizing an imaging device, a plurality of images of the optical marker by capturing each image of the plurality of images in a respective time interval; and extracting, utilizing the one or more processors, the displacement sequence associated with the excitation pattern from a first image of the plurality of images and a second image of the plurality of images;

wherein exciting the plurality of optical sources based on the excitation pattern comprises exciting an $i^{th}$ optical source set of a plurality of optical source sets at a first $i^{th}$ moment $T_{1i}$ and a second $i^{th}$ moment $T_{2i}$ for $\Delta T$ seconds, each of the plurality of optical source sets comprising a respective subset of the plurality of optical sources, an intersection of each two different optical source sets of the plurality of source sets comprising a null set, where:

$T_{1i}=(i-1)T/N$, where $1 \leq i \leq N$, $N \leq M-1$, $M>1$ is a number of the plurality of source sets, and T is an exposure time of the imaging device, $T_{2i}=t_d+(i-1)T/N$, where $t_d \geq T$ is a time difference between capturing the first image and capturing the second image, and $\Delta T \leq \delta/V_{max}$ where S is a displacement error threshold and $V_{max}$ is an upper speed limit of the object.

2. The method of claim 1, wherein mounting the optical marker comprises:
attaching a $(u,j)^{th}$ optical source of the plurality of optical sources to a $(u,j)^{th}$ point located on a surface of a plate where $1 \leq u \leq M$ and $j \geq 1$, the $(u,j)^{th}$ point associated with a $(u,j)^{th}$ node of a $j^{th}$ plurality of nodes in a $j^{th}$ cycle graph;
attaching a $(u+1,j)^{th}$ optical source of the plurality of optical sources to a $(u+1,j)^{th}$ point located on the surface of the plate, the $(u+1,j)^{th}$ point associated with a $(u+1,j)^{th}$ node of the $j^{th}$ plurality of nodes, the $(u+1,j)^{th}$ node comprising an adjacent node of the $(u,j)^{th}$ node; and
attaching the plate to the object;
wherein:
a distance $d_{ki}$ between an $(i,j)^{th}$ node of the $j^{th}$ plurality of nodes and a $(k,j)^{th}$ node of the $j^{th}$ plurality of nodes satisfies a condition according to $d_{ki} \geq V_{max}|k-i|\Delta T$ where $1 \leq k \leq N$;
a $(1,j)^{th}$ node of the $j^{th}$ plurality of nodes comprises an adjacent node of an $(M,j)^{th}$ node of the $j^{th}$ plurality of nodes; and
a distance $d_{N1}$ between the $(1,j)^{th}$ node and an $(N,j)^{th}$ node of the $j^{th}$ plurality of nodes satisfies a condition according to $d_{N1} > d_{sv}$ where $d_{sv}$ is a distance between a $(s,j)^{th}$ node of the $j^{th}$ plurality of nodes and a $(v,j)^{th}$ node of the $j^{th}$ plurality of nodes, the $(s,j)^{th}$ node comprising an adjacent node of the $(v,j)^{th}$ node, where $1 \leq s \leq M$ and $1 \leq v \leq M$.

3. The method of claim 2, wherein exciting the plurality of optical sources further comprises extracting a $j^{th}$ optical feature of a plurality of optical features from the plurality of optical sources, the $j^{th}$ optical feature associated with the $j^{th}$ cycle graph, the $j^{th}$ optical feature being different from an $r^{th}$ optical feature of the plurality of optical features where $r \geq 1$ and $r \neq j$.

4. The method of claim 3, wherein extracting the displacement sequence comprises extracting a first $(i,j)^{th}$ optical mark from the first image, the first $(i,j)^{th}$ optical mark associated with the first $i^{th}$ moment $T_{1i}$ and the $j^{th}$ optical feature, the first $(i,j)^{th}$ optical mark comprising a first $(i,j)^{th}$ horizontal position of a plurality of horizontal positions and a first $(i,j)^{th}$ vertical position of a plurality of vertical positions, extracting the first $(i,j)^{th}$ optical mark comprising:
extracting a first plurality of optical marks from the first image, each optical mark of the first plurality of optical marks associated with a respective optical source of the plurality of optical sources;
obtaining a first $j^{th}$ optical mark set comprising the first $(i,j)^{th}$ optical mark by selecting a subset of the first plurality of optical marks associated with the $j^{th}$ optical feature;
obtaining a first $j^{th}$ plurality of distances, each distance of the first $j^{th}$ plurality of distances associated with a respective pair of optical marks in the first $j^{th}$ optical mark set;
extracting a first $(1,j)^{th}$ optical mark from the first $j^{th}$ optical mark set based on a $j^{th}$ direction associated with the $j^{th}$ cycle graph, the first $(1,j)^{th}$ optical mark associated with a largest of the first $j^{th}$ plurality of distances;
obtaining a first $(n-1)^{th}$ distance set, each distance in the first $(n-1)^{th}$ distance set associated with a first $(n-1,j)^{th}$ optical mark in the first $j^{th}$ optical mark set where $2 \leq n \leq N$; and
extracting a first $(n,j)^{th}$ optical mark from the first $j^{th}$ optical mark set, the first $(n,j)^{th}$ optical mark associated with a smallest distance in the first $(n-1)^{th}$ distance set.

5. The method of claim 4, wherein:
exciting the plurality of optical sources further comprises exciting an $(M,j)^{th}$ optical source of the plurality of optical sources at a moment $t_d - T/N$;
capturing the plurality of images comprises:
capturing the first image in a time interval $(0,T)$;
capturing the second image in a time interval $(t_d, t_d + T)$; and
capturing a third image of the plurality of images in a time interval $(t_d - T, t_d)$.

6. The method of claim 5, wherein extracting the displacement sequence further comprises extracting a second $(i,j)^{th}$ optical mark from the second image, the second $(i,j)^{th}$ optical mark associated with the second $i^{th}$ moment $T_{2i}$ and the $j^{th}$ optical feature, the second $(i,j)^{th}$ optical mark comprising a second $(i,j)^{th}$ horizontal position of the plurality of horizontal positions and a second $(i,j)^{th}$ vertical position of the plurality of vertical positions, extracting the second $(i,j)^{th}$ optical mark comprising:
extracting a second plurality of optical marks from the second image, each optical mark of the second plurality of optical marks associated with a respective optical source of the plurality of optical sources;
obtaining a second $j^{th}$ optical mark set comprising the second $(i,j)^{th}$ optical mark by selecting a subset of the second plurality of optical marks associated with the $j^{th}$ optical feature;
extracting a third $j^{th}$ optical mark from the third image, the third $j^{th}$ optical mark associated with the $(M,j)^{th}$ optical source;
obtaining a second $j^{th}$ plurality of distances, each distance of the second $j^{th}$ plurality of distances comprising a distance between a respective optical mark in the second $j^{th}$ optical mark set and the third $j^{th}$ optical mark;
extracting a second $(1,j)^{th}$ optical mark from the second $j^{th}$ optical mark set based on the $j^{th}$ direction, the second $(1,j)^{th}$ optical mark associated with a smallest distance of the second $j^{th}$ plurality of distances;
obtaining a second $(n-1)^{th}$ distance set, each distance in the second $(n-1)^{th}$ distance set associated with a second $(n-1,j)^{th}$ optical mark in the second $j^{th}$ optical mark set; and
extracting a second $(n,j)^{th}$ optical mark from the second $j^{th}$ optical mark set, the second $(n,j)^{th}$ optical mark associated with a smallest distance in the second $(n-1)^{th}$ distance set.

7. The method of claim 6, further comprising obtaining a center point of the optical marker, comprising:
calculating an average horizontal position of the center point by averaging the plurality of horizontal positions of the optical marker; and
calculating an average vertical position of the center point by averaging the plurality of vertical positions of the optical marker.

8. The method of claim 7, wherein extracting the displacement sequence further comprises obtaining an $i^{th}$ displacement set of the displacement sequence, comprising:
calculating a first $i^{th}$ horizontal center $x_{ci}$ and a first $i^{th}$ vertical center $y_{ci}$ according to a set of operations defined by:

$$x_{ci} = (x_{i1} + x_{i2})/2$$

$$y_{ci} = (y_{i1} + y_{i2})/2$$

where:
  $x_{i1}$ is a first $(i,1)^{th}$ horizontal position of the plurality of horizontal positions,
  $x_{i2}$ is a first $(i,2)^{th}$ horizontal position of the plurality of horizontal positions,
  $y_{i1}$ is a first $(i,1)^{th}$ vertical position of the plurality of vertical positions, and
  $y_{i2}$ is a first $(i,2)^{th}$ vertical position of the plurality of vertical positions;
calculating a second $i^{th}$ horizontal center $x'_{ci}$ and a second $i^{th}$ vertical center $y'_{ci}$ according to a set of operations defined by:

$$x'_{ci}=(x'_{i1}+x'_{i2})/2$$

$$y'_{ci}=(y'_{i1}+y'_{i2})/2$$

where:
  $x'_{i1}$ is a second $(i,1)^{th}$ horizontal position of the plurality of horizontal positions,
  $x'_{i2}$ is a second $(i,2)^{th}$ horizontal position of the plurality of horizontal positions,
  $y'_{i1}$ is a second $(i,1)^{th}$ vertical position of the plurality of vertical positions, and
  $y'_{i2}$ is a second $(i,2)^{th}$ vertical position of the plurality of vertical positions;
calculating an $i^{th}$ rotation $\Delta\theta_i$ of the $i^{th}$ displacement set according to a set of operations defined by:

$$\Delta\theta_i = \tan^{-1}\frac{y'_{i2}-y'_{i1}}{x'_{i2}-x'_{i1}} - \tan^{-1}\frac{y_{i2}-y_{i1}}{x_{i2}-x_{i1}};$$

calculating an $i^{th}$ horizontal difference $\Delta x_{ci}$ and an $i^{th}$ vertical difference $\Delta y_{ci}$ according to a set of operations defined by:

$$\Delta x_{ci}=x_c-x_{ci}$$

$$\Delta y_{ci}=y_c-y_{ci}$$

where:
  $x_c$ is the average horizontal position, and
  $y_c$ is the average vertical position;
calculating an $i^{th}$ horizontal displacement $\Delta x_i$ of the $i^{th}$ displacement set according to a set of operations defined by:

$$\Delta x_i=x'_{ci}-x_c+\Delta x_{ci}\cos\Delta\theta_i-\Delta y_{ci}\sin\Delta\theta_i; \text{ and}$$

calculating an $i^{th}$ vertical displacement $\Delta y_i$ of the $i^{th}$ displacement set according to a set of operations defined by:

$$\Delta y_i=y'_{ci}-y_c+\Delta x_{ci}\sin\Delta\theta_i+\Delta y_{ci}\cos\Delta\theta_i.$$

9. A system for estimating a displacement sequence of an object, the system comprising:
an optical marker configured to be mounted on the object, the optical marker comprising a plurality of optical sources;
a camera configured to capture a plurality of images of the object by capturing each image of the plurality of images in a respective time interval;
a memory having processor-readable instructions stored therein; and
one or more processors configured to access the memory and the camera and execute the processor-readable instructions, which, when executed by the one or more processors configures the one or more processors to perform a method, the method comprising:
  exciting the plurality of optical sources based on an excitation pattern; and
  extracting the displacement sequence associated with the excitation pattern from a first image of the plurality of images and a second image of the plurality of images;
wherein exciting the plurality of optical sources based on the excitation pattern comprises exciting an $i^{th}$ optical source set of a plurality of optical source sets at a first $i^{th}$ moment $T_{1i}$ and a second $i^{th}$ moment $T_{2i}$ for $\Delta T$ seconds, each of the plurality of optical source sets comprising a respective subset of the plurality of optical sources, an intersection of each two different optical source sets of the plurality of source sets comprising a null set, where:
  $T_{1i}=(i-1)T/N$, where $1\leq i\leq N$, $N\leq M-1$, $M>1$ is a number of the plurality of source sets, and T is an exposure time of the camera,
  $T_{2i}=t_d+(i-1)T/N$, where $t_d \geq T$ is a time difference between capturing the first image and capturing the second image, and
  $\Delta T\leq \delta/V_{max}$ where S is a displacement error threshold and $V_{max}$ is an upper speed limit of the object.

10. The system of claim 9, further comprising a plate configured to be attached to the object, wherein:
a $(u,j)^{th}$ optical source of the plurality of optical sources is configured to be attached to a $(u,j)^{th}$ point located on a surface of the plate where $1\leq u<M$ and $j\geq 1$, the $(u,j)^{th}$ point associated with a $(u,j)^{th}$ node of a $j^{th}$ plurality of nodes in a $j^{th}$ cycle graph;
a $(u+1,j)^{th}$ optical source of the plurality of optical sources is configured to be attached to a $(u+1,j)^{th}$ point located on the surface of the plate, the $(u+1,j)^{th}$ point associated with a $(u+1,j)^{th}$ node of the $j^{th}$ plurality of nodes, the $(u+1,j)^{th}$ node comprising an adjacent node of the $(u,j)^{th}$ node;
a distance $d_{ki}$ between an $(i,j)^{th}$ node of the $j^{th}$ plurality of nodes and a $(k,j)^{th}$ node of the $j^{th}$ plurality of nodes satisfies a condition according to $d_{ki}\geq V_{max}|k-i|\Delta T$ where $1\leq k\leq N$;
a $(1,j)^{th}$ node of the $j^{th}$ plurality of nodes comprises an adjacent node of an $(M,j)^{th}$ node of the $j^{th}$ plurality of nodes; and
a distance $d_{N1}$ between the $(1,j)^{th}$ node and an $(N,j)^{th}$ node of the $j^{th}$ plurality of nodes satisfies a condition according to $d_{N1}>d_{sv}$ where $d_{sv}$ is a distance between a $(s,j)^{th}$ node of the $j^{th}$ plurality of nodes and a $(v,j)^{th}$ node of the $j^{th}$ plurality of nodes, the $(s,j)^{th}$ node comprising an adjacent node of the $(v,j)^{th}$ node, where $1\leq s\leq M$ and $1\leq v\leq M$.

11. The system of claim 10, wherein exciting the plurality of optical sources further comprises extracting a $j^{th}$ optical feature of a plurality of optical features from the plurality of optical sources, the $j^{th}$ optical feature associated with the $j^{th}$ cycle graph, the $j^{th}$ optical feature being different from an $r^{th}$ optical feature of the plurality of optical features where $r\geq 1$ and $r\neq j$.

12. The system of claim 11, wherein extracting the displacement sequence comprises extracting a first $(i,j)^{th}$ optical mark from the first image, the first $(i,j)^{th}$ optical mark associated with the first $i^{th}$ moment $T_{1i}$ and the $j^{th}$ optical feature, the first $(i,j)^{th}$ optical mark comprising a first $(i,j)^{th}$ horizontal position of a plurality of horizontal positions and a first $(i,j)^{th}$ vertical position of a plurality of vertical positions, extracting the first $(i,j)^{th}$ optical mark comprising:
  extracting a first plurality of optical marks from the first image, each optical mark of the first plurality of optical marks associated with a respective optical source of the plurality of optical sources;

obtaining a first $j^{th}$ optical mark set comprising the first $(i,j)^{th}$ optical mark by selecting a subset of the first plurality of optical marks associated with the $j^{th}$ optical feature;

obtaining a first $j^{th}$ plurality of distances, each distance of the first $j^{th}$ plurality of distances associated with a respective pair of optical marks in the first $j^{th}$ optical mark set;

extracting a first $(1,j)^{th}$ optical mark from the first $j^{th}$ optical mark set based on a $j^{th}$ direction associated with the $j^{th}$ cycle graph, the first $(1,j)^{th}$ optical mark associated with a largest of the first $j^{th}$ plurality of distances;

obtaining a first $(n-1)^{th}$ distance set, each distance in the first $(n-1)^{th}$ distance set associated with a first $(n-1,j)^{th}$ optical mark in the first $j^{th}$ optical mark set where $2 \le n \le N$; and extracting a first $(n,j)^{th}$ optical mark from the first $j^{th}$ optical mark set, the first $(n,j)^{th}$ optical mark associated with a smallest distance in the first $(n-1)^{th}$ distance set.

13. The system of claim 12, wherein exciting the plurality of optical sources further comprises exciting an $(M,j)^{th}$ optical source of the plurality of optical sources at a moment $t_d - T/N$.

14. The system of claim 11, wherein the camera is further configured to:
capture the first image in a time interval $(0,T)$;
capture the second image in a time interval $(t_d, t_d+T)$; and
capture a third image of the plurality of images in a time interval $(t_d-T, t_d)$.

15. The system of claim 14, wherein extracting the displacement sequence further comprises extracting a second $(i,j)^{th}$ optical mark from the second image, the second $(i,j)^{th}$ optical mark associated with the second $i^{th}$ moment $T_{2i}$ and the $j^{th}$ optical feature, the second $(i,j)^{th}$ optical mark comprising a second $(i,j)^{th}$ horizontal position of a plurality of horizontal positions and a second $(i,j)^{th}$ vertical position of a plurality of vertical positions, extracting the second $(i,j)^{th}$ optical mark comprising:

extracting a second plurality of optical marks from the second image, each optical mark of the second plurality of optical marks associated with a respective optical source of the plurality of optical sources;

obtaining a second $j^{th}$ optical mark set comprising the second $(i,j)^{th}$ optical mark by selecting a subset of the second plurality of optical marks associated with the $j^{th}$ optical feature;

extracting a third $j^{th}$ optical mark from the third image, the third $j^{th}$ optical mark associated with the $(M,j)^{th}$ optical source;

obtaining a second $j^{th}$ plurality of distances, each distance of the second $j^{th}$ plurality of distances comprising a distance between a respective optical mark in the second $j^{th}$ optical mark set and the third $j^{th}$ optical mark;

extracting a second $(1,j)^{th}$ optical mark from the second $j^{th}$ optical mark set based on the $j^{th}$ direction, the second $(1,j)^{th}$ optical mark associated with a smallest distance of the second $j^{th}$ plurality of distances;

obtaining a second $(n-1)^{th}$ distance set, each distance in the second $(n-1)^{th}$ distance set associated with a second $(n-1,j)^{th}$ optical mark in the second $j^{th}$ optical mark set; and extracting a second $(n,j)^{th}$ optical mark from the second $j^{th}$ optical mark set, the second $(n,j)^{th}$ optical mark associated with a smallest distance in the second $(n-1)^{th}$ distance set.

16. The system of claim 15, wherein the method further comprises obtaining a center point of the optical marker, comprising:
calculating an average horizontal position of the center point by averaging the plurality of horizontal positions of the optical marker; and
calculating an average vertical position of the center point by averaging the plurality of vertical positions of the optical marker.

17. The system of claim 16, wherein extracting the displacement sequence further comprises obtaining an $i^{th}$ displacement set of the displacement sequence, comprising:
calculating a first $i^{th}$ horizontal center $x_{ci}$ and a first $i^{th}$ vertical center $y_{ci}$ according to a set of operations defined by:

$$x_{ci} = (x_{i1} + x_{i2})/2$$

$$y_{ci} = (y_{i1} + y_{i2})/2$$

where:
$x_{i1}$ is a first $(i,1)^{th}$ horizontal position of the plurality of horizontal positions,
$x_{i2}$ is a first $(i,2)^{th}$ horizontal position of the plurality of horizontal positions,
$y_{i1}$ is a first $(i,1)^{th}$ vertical position of the plurality of vertical positions, and
$y_{i2}$ is a first $(i,2)^{th}$ vertical position of the plurality of vertical positions;

calculating a second $i^{th}$ horizontal center $x'_{ci}$ and a second $i^{th}$ vertical center $y'_{ci}$ according to a set of operations defined by:

$$x'_{ci} = (x'_{i1} + x'_{i2})/2$$

$$y'_{ci} = (y'_{i1} + y'_{i2})/2$$

where:
$x'_{i1}$ is a second $(i,1)^{th}$ horizontal position of the plurality of horizontal positions,
$x'_{i2}$ is a second $(i,2)^{th}$ horizontal position of the plurality of horizontal positions,
$y'_{i1}$ is a second $(i,1)^{th}$ vertical position of the plurality of vertical positions, and
$y'_{i2}$ is a second $(i,2)^{th}$ vertical position of the plurality of vertical positions;

calculating an $i^{th}$ rotation $\Delta\theta_i$ of the $i^{th}$ displacement set according to a set of operations defined by:

$$\Delta\theta_i = \tan^{-1}\frac{y'_{i2} - y'_{i1}}{x'_{i2} - x'_{i1}} - \tan^{-1}\frac{y_{i2} - y_{i1}}{x_{i2} - x_{i1}};$$

calculating an $i^{th}$ horizontal difference $\Delta x_{ci}$ and an $i^{th}$ vertical difference $\Delta y_{ci}$ according to a set of operations defined by:

$$\Delta x_{ci} = x_c - x_{ci}$$

$$\Delta y_{ci} = y_c - y_{ci}$$

where:
$x_c$ is the average horizontal position, and
$y_c$ is the average vertical position;

calculating an $i^{th}$ horizontal displacement $\Delta x_i$ of the $i^{th}$ displacement set according to a set of operations defined by:

$$\Delta x_i = x'_{ci} - x_c + \Delta x_{ci}\cos\Delta\theta_i - \Delta y_{ci}\sin\Delta\theta_i; \text{ and}$$

calculating an $i^{th}$ vertical displacement $\Delta y_i$ of the $i^{th}$ displacement set according to a set of operations defined by:

$$\Delta y_i = y'_{ci} - y_c + \Delta x_{ci} \sin \Delta \theta_i + \Delta y_{ci} \cos \Delta \theta_i.$$

* * * * *